July 30, 1935. W. D. FOSTER ET AL 2,009,442
PHOTOGRAPHIC APPARATUS
Filed Jan. 18, 1932 9 Sheets-Sheet 1
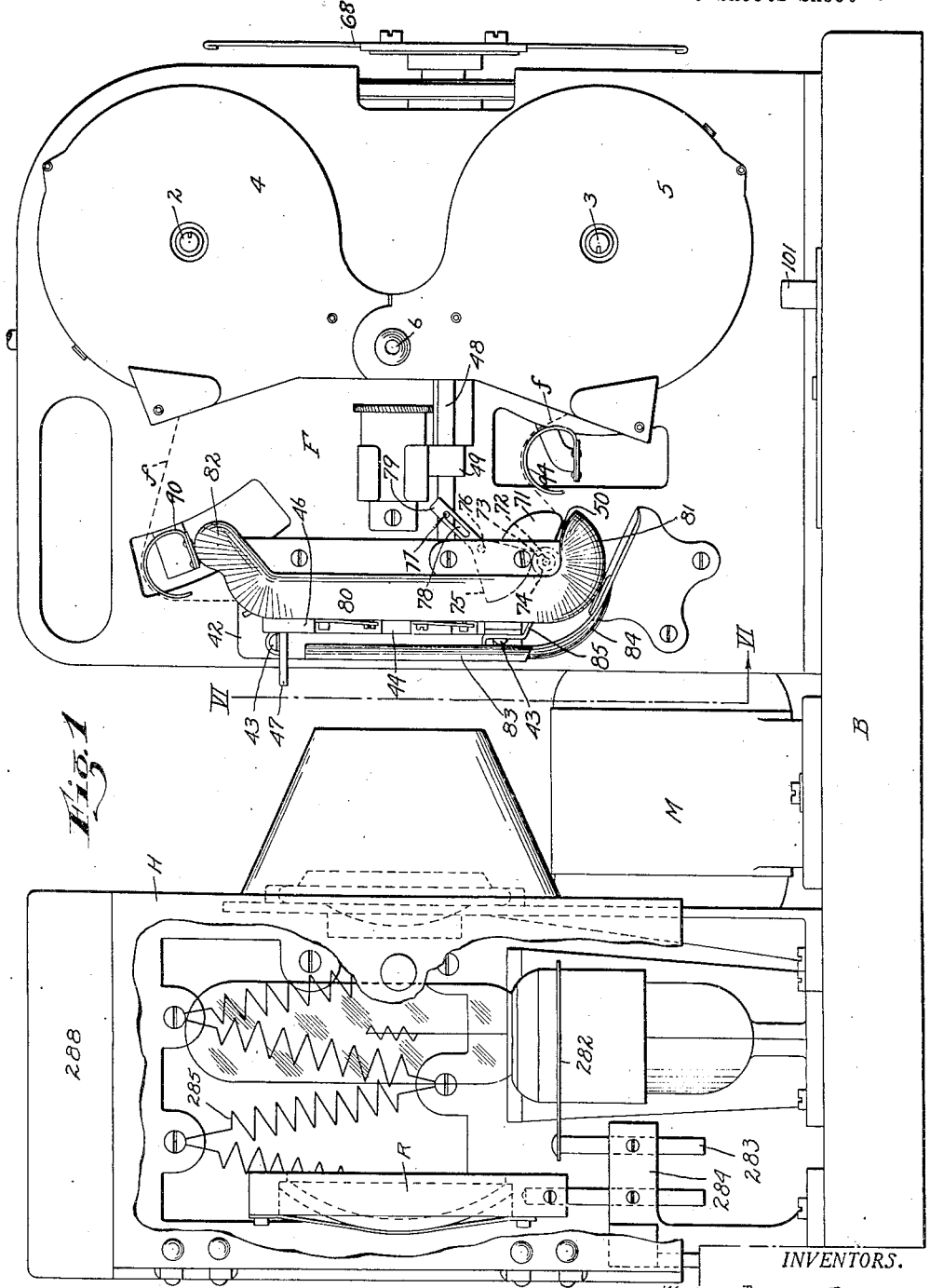
INVENTORS.
WARREN DUNHAM FOSTER AND
EARLE L. PARMELEE
BY
*Wm. W. Lillard*
ATTORNEY.

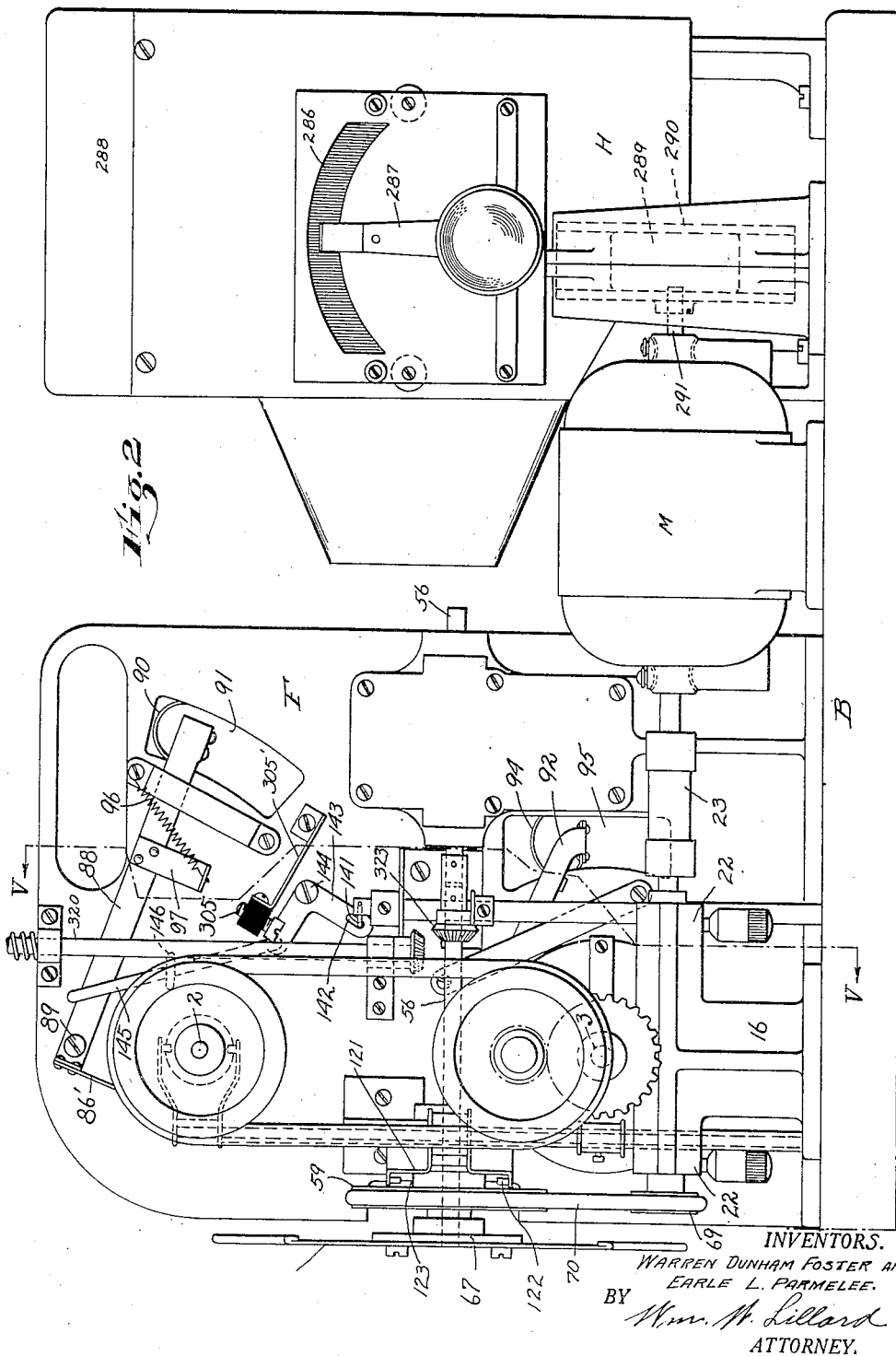

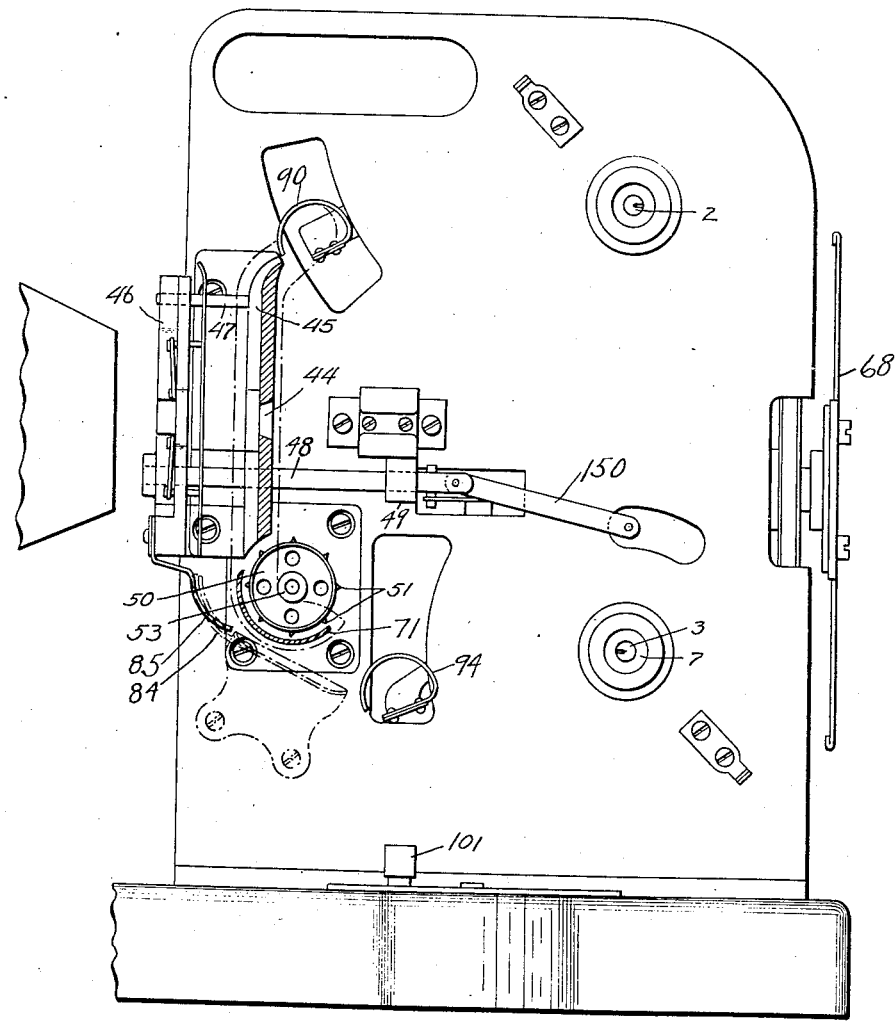

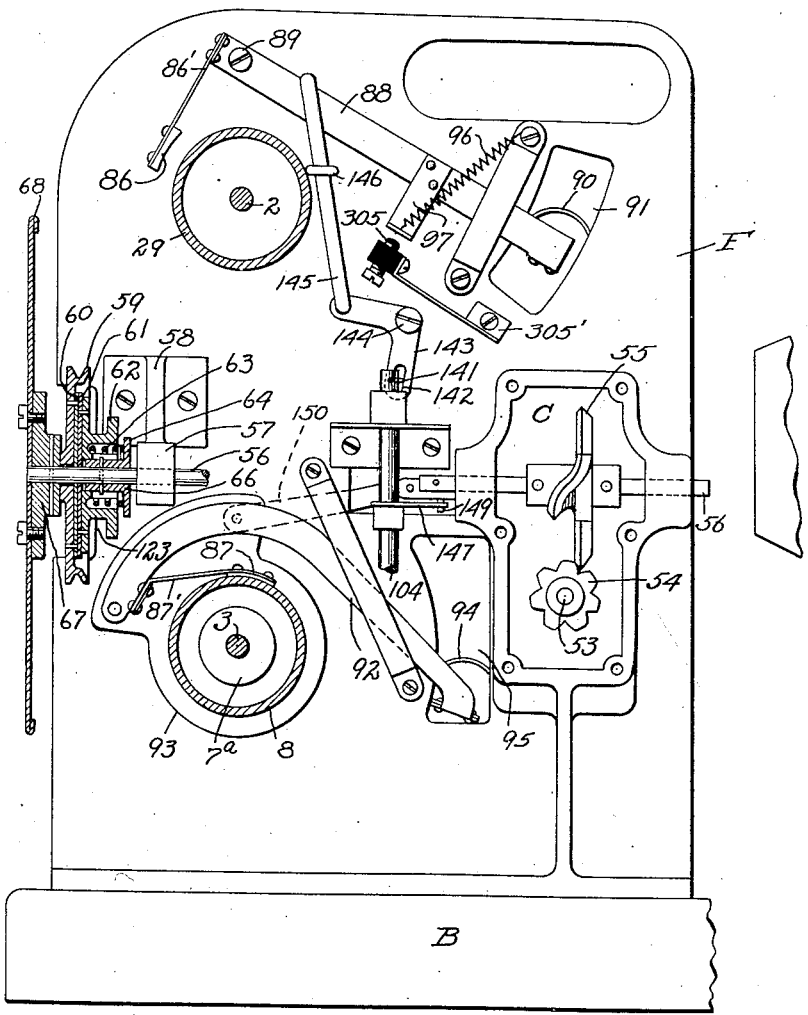
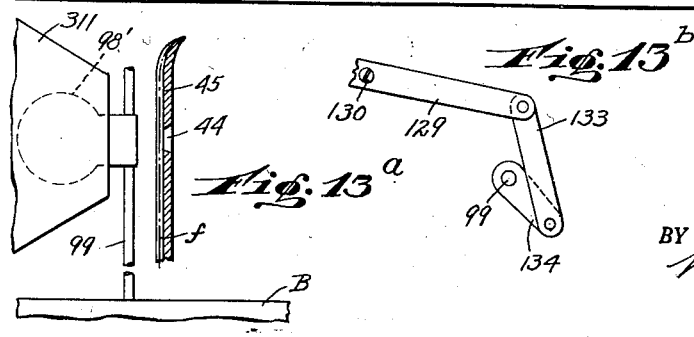

July 30, 1935.  W. D. FOSTER ET AL  2,009,442
PHOTOGRAPHIC APPARATUS
Filed Jan. 18, 1932  9 Sheets-Sheet 5
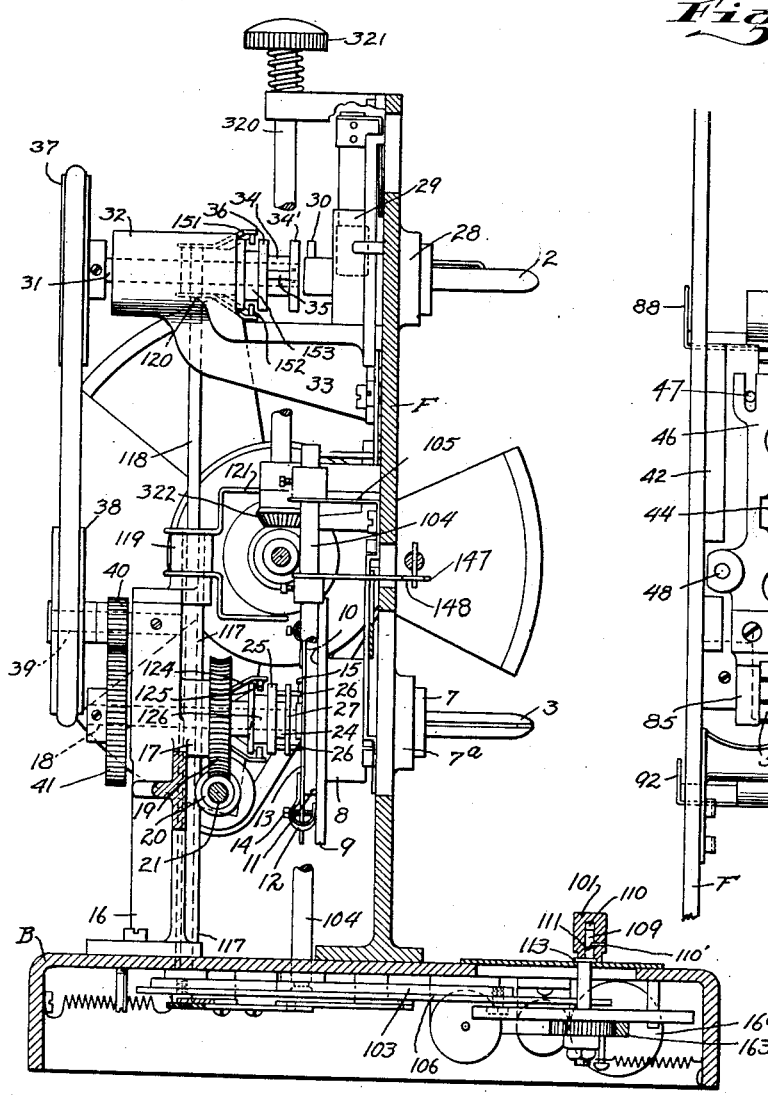
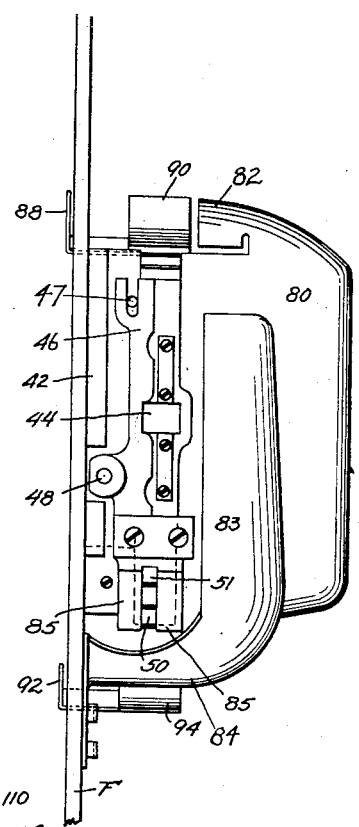
INVENTORS.
WARREN DUNHAM FOSTER AND
EARLE L. PARMELEE.
BY Wm. W. Lillard
ATTORNEY.

INVENTORS.
WARREN DUNHAM FOSTER, AND
EARLE L. PARMELEE.
Wm. W. Lillard
ATTORNEY.

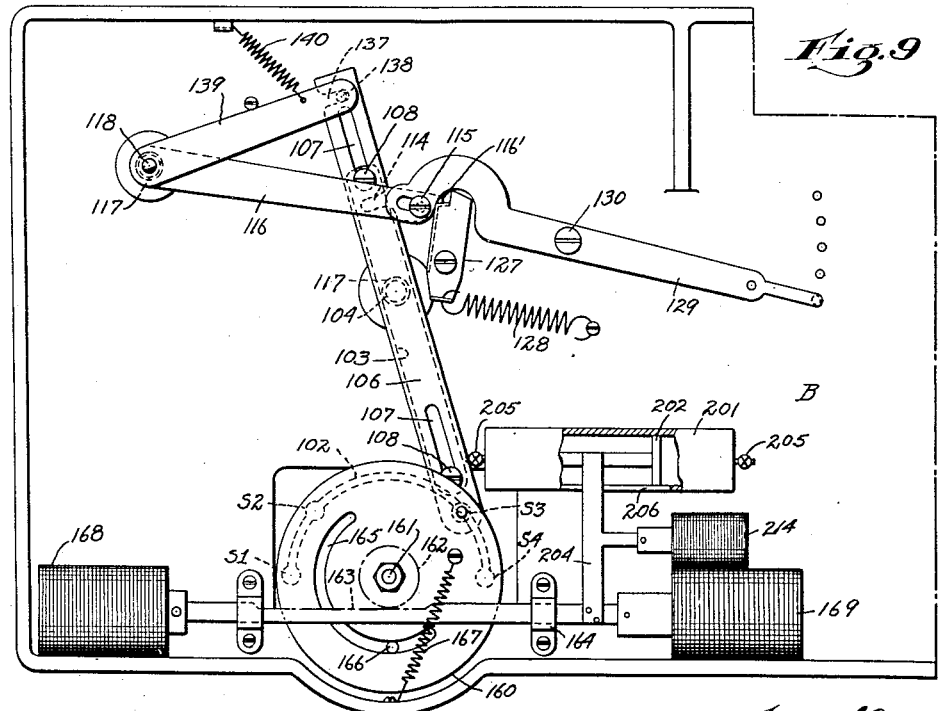
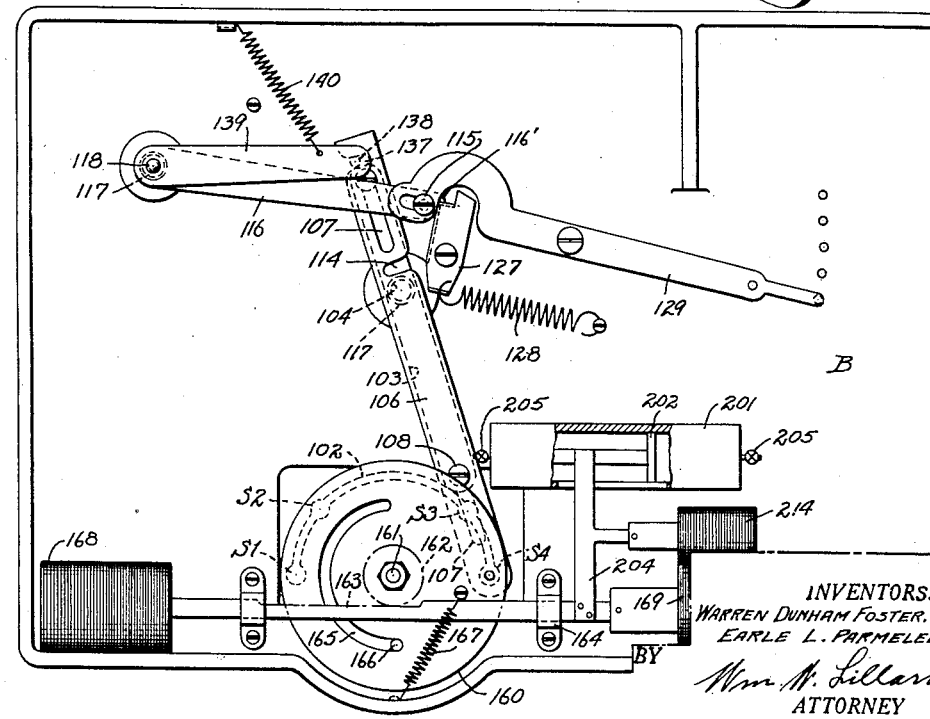

July 30, 1935.  W. D. FOSTER ET AL  2,009,442
PHOTOGRAPHIC APPARATUS
Filed Jan. 18, 1932   9 Sheets-Sheet 8
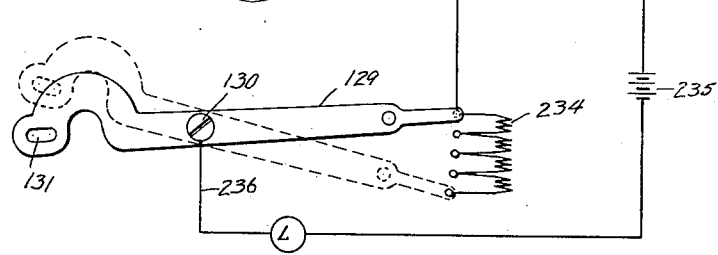
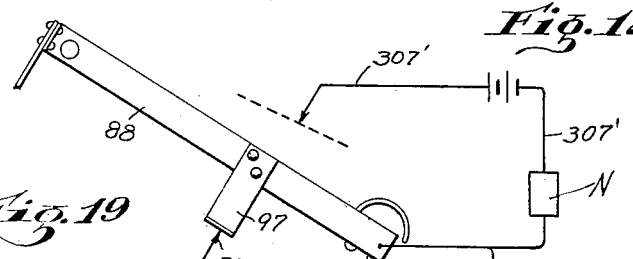
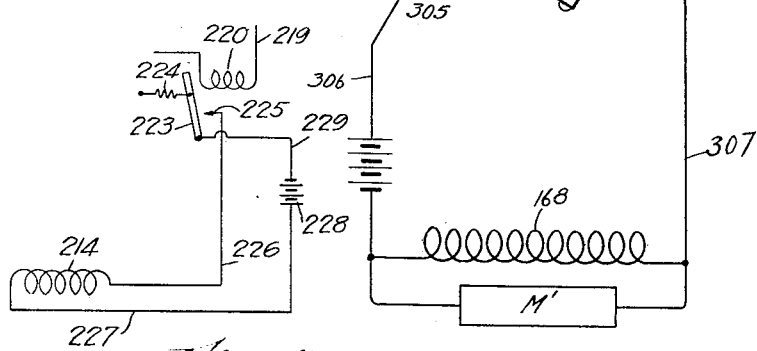
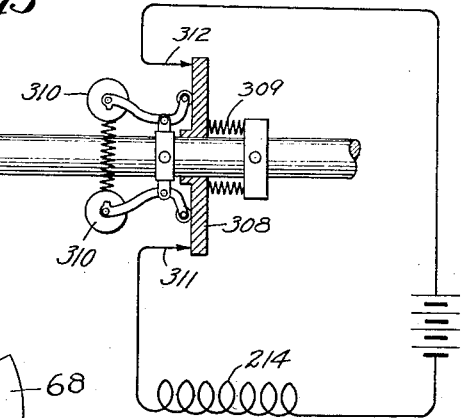
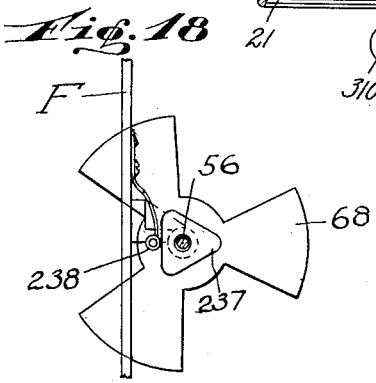
INVENTORS.
WARREN DUNHAM FOSTER, AND
EARLE L. PARMELEE.
BY Wm. W. Lillard
ATTORNEY.

July 30, 1935.    W. D. FOSTER ET AL    2,009,442
PHOTOGRAPHIC APPARATUS
Filed Jan. 18, 1932    9 Sheets-Sheet 9
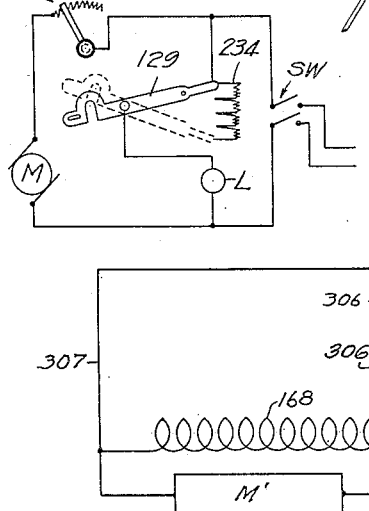
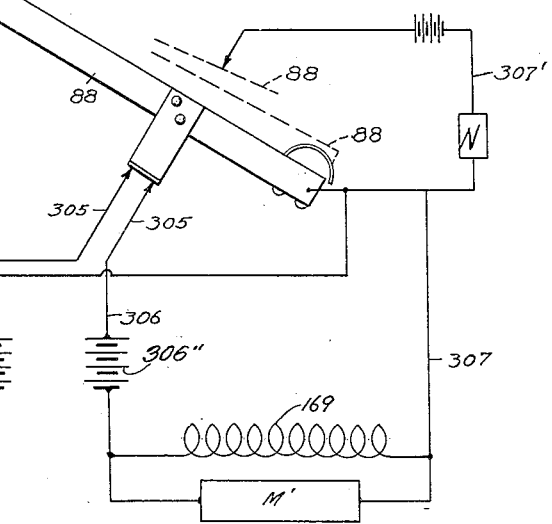
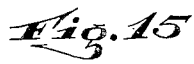
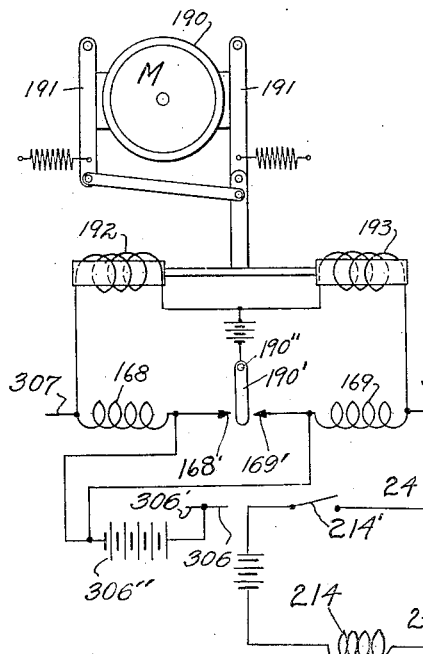
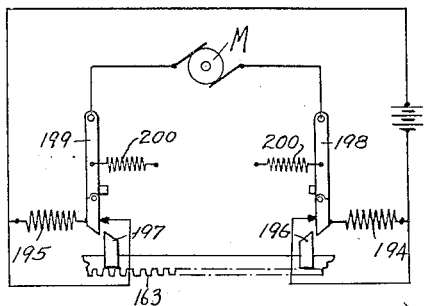
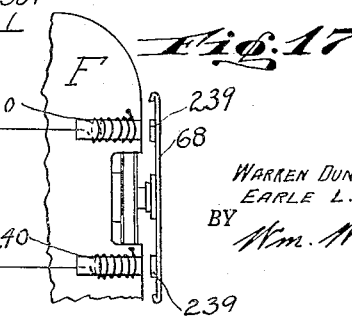
INVENTORS.
WARREN DUNHAM FOSTER, AND
EARLE L. PARMELEE.
BY Wm. W. Lillard
ATTORNEY.

Patented July 30, 1935

2,009,442

UNITED STATES PATENT OFFICE 2,009,442

PHOTOGRAPHIC APPARATUS

Warren Dunham Foster, Washington Township, Bergen County, N. J., and Earle L. Parmelee, Pittsburgh, Pa.; Peoples-Pittsburgh Trust Company executor of said Earle L. Parmelee, deceased; said Peoples-Pittsburgh Trust Company, assignor to said Foster Application January 18, 1932, Serial No. 587,393

72 Claims. (Cl. 88—17)

This application is a continuation in part of our co-pending application, Serial Number 105,159, filed April 28, 1926 now Patent 1,944,024.

The present invention relates particularly to the art of photographic apparatus, the term "photographic" herein being used generically as definitive not only of apparatus frequently designated as "cameras" or by a similar name, but also of apparatus usually generically referred to as "motion picture projecting apparatus" as well as to stereopticon apparatus. The invention has special utility, however, with respect to the projection of pictures in motion, such as required for amusement either in the theatre or in the home, or for educational or advertising purposes. The utility of the invention is, however, not limited in this respect, it being equally well adapted for general use by either skilled or unskilled operators for the projection of pictures either in motion or as so-called "still" pictures.

At the present time, considerable attention is being devoted to the construction of apparatus capable of being utilized for the repetitious display of motion pictures from a strip of film. By reason, however, of the fragile character of the film which must be used, and the difficulties of effecting reversal of its direction of travel, or rewinding of an exposed length, such apparatus has heretofore required not only a great deal of operating attention, but also frequent renewal of films or repair thereof. Our invention is particularly adapted for use in apparatus of the foregoing type and also for apparatus, for use in the home or otherwise, in which the motion picture is projected and then automatically rewound in readiness for the next showing which may take place immediately or at some future time.

Efforts have also been made to effect continuous film travel in the same direction by securing the ends of the film together and providing some means for attempting adequately to take care of the main body of the film while the remaining comparatively short portion of the film has been passing through the gate. Considerable difficulty has, however, been experienced in this type of apparatus and its use has been necessarily limited.

In the copending application of Warren Dunham Foster, Serial No. 57,392, filed September 19, 1925 now Patent 1,943,303, there is disclosed and claimed an improved form of apparatus of the general nature adaptable for example, in accordance with the present invention. In that application, the operation of the apparatus with relation to the direction of movement of the film, the speed of movement of the film, or the character of movement of the film is controlled automatically by the film itself, preferably through the agency of electrically operated devices having circuits energized or deenergized by the film itself during the travel thereof. Apparatus of such character has been found to be extremely desirable, due to the rapidity of control which may be obtained and the effectiveness of such control. In many cases, however, it may be desirable or necessary, due either to the particular construction of the apparatus being utilized, the construction or nature of the film or for other reasons, to provide means for controlling the film, as already set forth, without the necessity of providing it with special attachments, notches or specially constructed portions for the purpose of effecting any desired electrical operation directly.

In our parent application, we describe and claim means for controlling the movement of the film and the actuation of all of the operable elements of the film handling apparatus by the character or intensity of light transmitted by the film itself. In the present application, we describe and claim means for the exercise of such control and actuation by the tension of the film itself. The present application has for certain of its objects, therefore, the provision of mechanism whereby the film is utilized for controlling its direction, speed and character of movement entirely by reason of the tension thereof as well as for actuating the operable elements of the apparatus.

Another major object of the present invention is to provide mechanism whereby the amount of current reaching the light source is controlled in interlocked or predetermined relation to the operation of the other elements of the apparatus. Such control of the light source is preferably exercised by the tension of the film itself, but may be exercised manually or in accordance with the teaching of our parent application, or of the said application of the said Foster, or otherwise.

By means of such mechanism the amount of current reaching the light source and consequently the heat falling upon the film at such times as the film is stationary is automatically reduced. At such times as the film is being used for the projection of so-called still or stereopticon pictures or at those times when the film is moving below a predetermined speed, and would consequently be endangered if full light and heat fell upon it, the current is so diminished that this danger is avoided. Moreover, this feature of the invention is so arranged that the amount of current reaching the lamp when the apparatus is being placed in operation is much reduced, whereby the filament gradually heats and the life of the lamp is thereby correspondingly increased. In other projectors, this result is accomplished by the provision of a supplemental variable rheostat, often in addition to a heat screen of suitable construction. Frequently, both of these devices must be manipulated by hand, thereby adding other items of expense and sources of trouble, particularly to amateur operators.

Attention is directed to our co-pending application Serial Number 587,392, filed concurrently herewith, a division of our said parent Patent Number 1,944,024, dated January 16, 1934. Said co-pending application contains certain subject matter similar to that contained herein, but is primarily devoted to the gate, and the parts immediately associated therewith, such as the pressure member and the protective member, and to the gate (or its said associated members) in combination with the means for controlling the current reaching the light source. The present application, however, claims the gate only in addition to other novel elements of the respective combinations.

This invention has for other of its objects the provision of apparatus responsive to the film itself for giving a visual, audible or other signaling indication as to the proper time of commencement or cessation of operations associated with the main operation, and also for directly controlling such associated operation. An associated operation of the character herein contemplated may comprise the control of a radio receiving or transmitting apparatus, phonographic or other sound producing apparatus or the like, the lighting of the room in which the apparatus is being utilized, the illumination or darkening of advertising announcements or other signs, or their mechanical display or manipulation. Other examples will at once suggest themselves to those skilled in the art. The advantages of the invention in this respect are greatly enhanced by the fact that it provides a simple means, definitely and automatically controlled by the film itself, whereby these associated operations or any desired number of them, may be conducted in any preordained timed relation as the operator may determine in advance, and without any attention thereafter.

Still further objects of the present invention are to provide a system of control responsive to variations in tension of the film for effecting cessation of operation of the apparatus, in the event that the feeding of the film becomes abnormal and for the automatic re-commencement of the normal operation when the film is in normal condition. Such system automatically and immediately affects all of the operable elements of the apparatus, as, for example, lamp, motor, feeding and rewinding clutches, gate opening mechanism, and the stripping and protective shield.

The present invention in all of its aspects contemplates a control of the general character herein referred to, which may be utilized either alone or in combination with a manual control or thrown entirely out of operation at the will of the operator.

The present invention has for still other of its objects the utilization of means for obtaining desirable results with respect to the obtaining of a period of dwell between periods of normal feed, as required for projection and rewinding purposes, as well as the control of this period whereby it may be variably timed in accordance with the type of film being handled whereby it may be long enough to avoid undue strain on even the most delicate films.

The present invention likewise contemplates the control automatically of operations as referred to, without subjecting the motor normally used for projection purposes to any extra load, thereby enabling the use of a motor of maximum power with a minimum current consumption.

The present invention is adaptable for use with films of the character having one or both ends secured to different carriers by means of lengths of fire-resisting or fireproof material, such as asbestos, copper or the like, whereby the possibility of injury to the film is minimized, although it is equally adaptable to films in which such lengths of connecting material are entirely omitted, or to films the ends of which are not attached to the delivery carriers.

A further object of the invention is to provide means under the control of the tension of the film itself operative to diminish the speed of the feeding mechanism during the periods of stripping the film from such mechanism or of the engagement of such mechanism with the film, whereby the film is protected during such periods as have heretofore represented the periods of hardest usage.

In the accompanying drawings, there are shown for purposes of illustration only certain embodiments of the present invention. The drawings with respect to the character of the projecting apparatus and the type of control are illustrative only, it being obvious that changes in the construction, operation and manner of control may be made without departing from either the spirit of our invention or the scope of our broader claims.

In the drawings:

Figure 1 is a right side elevation of the machine, certain parts of the lamp housing being broken away;

Figure 2 is a left side elevation of the machine;

Figure 3 is a partial right side elevation broken away to show actuating parts in film threading position;

Figure 4 is a partial left side elevation broken away to show actuating parts in film threading position;

Figure 5 is a cross section on the line V—V of Figure 2 looking in the direction of the arrows;

Figure 6 is a partial view taken on the line VI—VI of Figure 1 showing the right side only to illustrate a portion of the gate;

Figure 9 is a partial bottom plan view showing actuating levers in "film threading or changing" position;

Figure 10 is a partial bottom plan view showing actuating levers in "rewind" position;

Figure 11 is a view, largely diagrammatic, showing means for varying effective light intensity;

Figure 12 is a view, largely diagrammatic, illustrating the electrical circuit which operates the control mechanism;

Figure 13 is a detailed view, largely diagrammatic, illustrating means whereby cessation of operation of the driving motor may be utilized to control certain circuits or produce predeterminable results;

Figure 13a is a diagrammatic view of a portion of the structure of Figure 3 illustrating how a heat shield may be operated by the structure of the present invention.

Figure 13b is a fragmentary view of a lever system employed for operating the heat shield of the invention.

Figure 14 is a view largely diagrammatic which is similar to Figure 12 and illustrates electric circuits for operating the control mechanism for alternately feeding and rewinding the film;

Figure 15 is a diagrammatic view illustrating one form of control in which the speed of the feeding mechanism is automatically reduced by means of a brake;

Figure 16 is a diagrammatic view illustrating another means for accomplishing substantially the same result as is obtained by the structure of Figure 15;

Figures 17 and 18 are diagrammatic views illustrating different forms of mechanism for insuring the shutter stopping in the desired position, Figure 17 illustrating a magnetic control, and Figure 18 a mechanical control.

Figure 19 shows switch means for a single picture device.

Figure 20 is a wiring diagram of the apparatus.

Figure 7:
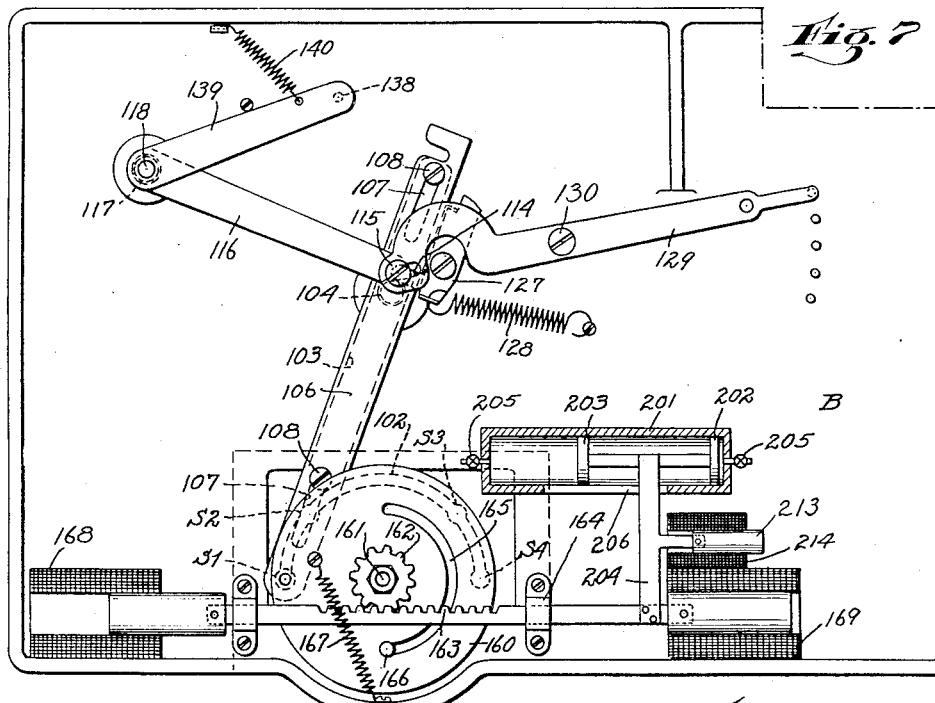
Figure 7 is a partial bottom plan view showing actuating levers "in normal intermittent projection" position.

In carrying out the present invention there may be provided an apparatus comprising a supporting base B having mounted thereon a lamp and resistance containing housing H and a supporting frame F upon which are mounted the operating parts of the film feeding and controlling mechanism per se.

Preferably carried by the frame F and projecting laterally from one side thereof in predetermined spaced relationship is a pair of reel receiving spindles 2 and 3, the upper spindle 2 being adapted for the holding of a reel of film during the feeding movement thereof and adapted to effect rewinding of the film at the conclusion of the feeding movement, while the lower spindle 3 is adapted to be positively driven simultaneously with the feeding movement for coiling or taking up the film as required. The ends of the film may be fastened to the spindles in any suitable way.

The film itself is preferably carried in a combined storage and exhibiting protector comprising a pair of containers 4 and 5 having a pivotal connection 6 whereby the containers may be relatively separated to a predetermined extent to expose the desired length of film therebetween. This construction may be substantially as disclosed and claimed in the United States Patent No. 1,440,173, granted December 26, 1922, to Herbert George Ponting and George William Ford, or may be of any other desired construction.

The lower spindle 3, which will hereafter be referred to as the driving spindle, is journaled for rotation in a suitable bearing 7 in the frame F. The back of the frame is formed with an enlarged boss 7a through which the spindle extends, and beyond the boss there is secured to the spindle a combined brake drum 8 and friction driving member 9. The driving member 9 has a friction surface 10 with which is adapted to cooperate a second friction member 11 in the form of a disk. The disk 11 and the driving member 9 are preferably held in frictional engagement by means of springs 12 carried by the member 9 and bearing against the disk 11 through the medium of an annulus 13, the springs being held under the desired tension and the annulus being maintained in position by adjusting screws 14.

Projecting rearwardly from the disk 11 is a driving lug 15 adapted to be engaged by a clutch hereinafter described in detail by means of which the driving spindle 3 may be frictionally rotated.

Projecting upwardly from the base B in spaced relation to the frame F is a bearing bracket 16 carrying a bearing 17 for a shaft 18 extending in alignment with the driving spindle 3. Secured in any desired manner to the shaft 18 for rotation therewith is a worm wheel 19 adapted to be driven by a worm 20 secured to a horizontally positioned driving shaft 21 located in the rear of the frame F. This shaft at its forward end is mounted in spaced bearings 22 carried by the bracket 16 and is connected to a driving motor M through a flexible coupling 23 of any desired or usual construction. The motor M and a lamp L, if desired, may be connected to a source of electricity through a usual rheostat R and a manually operable switch Sw. By reason of this mechanism, it will be apparent that when the motor M is operated the shaft 18 will be positively driven through the worm and wheel before referred to. For transmitting this rotational movement from the shaft 18 to the spindle 3 at will there is provided a sleeve 24 secured in any desired manner to the inner end of the shaft 18 and having slidably mounted thereon a collar 25 from which project pins 26 slidable through the enlarged end 27 of the sleeve 24. By moving the collar 25 to the right as viewed in Figure 5, the pins 26 are projected into the path of travel of the driving lug 15 whereby a drive is positively transmitted to the driving spindle. This clutch will hereinafter be referred to as the driving spindle clutch. In case it is desired to render this clutch more quickly operative, other clutch devices of well known construction may be provided in place of the driving lug 15 and the pins 26.

The spindle 2, which will hereinafter be designated the rewinding spindle, is mounted similarly to the driving spindle 3 in a bearing 28 carried by the frame F, and has secured to its rear end a brake drum 29 from which projects a pin or lug 30. Extending in alignment with the rewinding spindle 2 is a shaft 31 suitably journaled in a bearing 32 carried by a bracket 33 illustrated as secured to the frame F. Mounted on the inner end of the shaft 31 is a sleeve 34 having an enlarged end 34' through which project pins 35 carried by a collar 36 and constituting a rewinding clutch similar in construction and operation to the construction of the driving spindle clutch. Upon movement of the collar 36 to the right as viewed in Figure 5, the pins 35 will be brought into the path of travel of the pin or lug 30 whereby the rewinding spindle may be operated for effecting a rewinding of a previously displayed length of film.

For driving the shaft 31, it may conveniently have secured thereto a pulley 37 in line with a similar pulley 38 mounted on the outer end of a stub shaft 39 secured in the bracket 16. Also mounted on the shaft 39 is a spur gear 40 adapted to be driven by a similar, but preferably larger gear 41 on the outer end of the shaft 18. By passing a suitable belt around the pulleys 37 and 38 it will be apparent that the shafts 18 and 31 may be simultaneously rotated by the motor M, the shaft 31 preferably rotating at a higher speed than the shaft 18, and that rotative movement in turn may be imparted by either of these shafts to the respective spindles with which they are in alignment by suitable operation of the controlling clutches.

Mounted on the frame F adjacent the motor M and preferably on the front side of the frame is a gate section 42 preferably secured in any desired manner as by screws 43 against movement relatively to the frame. This section is preferably formed with an aperture 44 through which light may be projected as well understood in the art, and with a film guiding depression 45 extending lengthwise of the section, and intersecting the opening 44, for the travel of the film. Cooperating with the section 42 is a relatively movable section 46 preferably guided by a pin 47 projecting outwardly from the section 42, and secured to one end of a gate opening rod 48 slidable through a suitable opening in the gate section 42 and a suitable bearing 49 on the frame F. By reason of this construction, it will be apparent that when the rod 48 is moved to the left as viewed in Figure 1, it will be effective for moving the section 46 away from the section 42 to permit the removal of a film and the insertion of a new film, while movement in the opposite direction will bring the sections into cooperative relationship.

For effecting the desired intermittent feeding motion of a film in position in the gate, there may be provided a rotatable feeding sprocket 50 having film engaging teeth 51 positioned to engage apertures positioned in the film f, in any desired manner. This sprocket is mounted on a shaft 53 extending transversely through the frame F and carrying at its opposite end a star wheel 54. This star wheel, which may be of any well known construction, is adapted to be intermittently driven by means of a cam 55 secured adjacent one end of a shutter shaft 56 journaled at one end in a grease casing C within which are mounted the cam 55 and star wheel 54, and at its opposite end journaled in a suitable bearing 57 carried by a bracket 58 projecting rearwardly from the frame F.

Mounted loosely on the shaft 56 adjacent the opposite end thereof is a pulley 59 having a frictionally faced member 60 adapted to be rendered operative at will by a clutch collar 62 having a frictionally faced member 61 engaging said member 60. The clutch collar is normally urged in such direction as to be in frictional driving engagement with the pulley 59 by means of a spring 63 abutting at one end against the bottom of a spring receiving recess formed in the collar and at the other end against a shoulder 64 on a spring sleeve 66 secured in any desired manner to the shaft 56 for rotation therewith. Secured to the shaft 56 outside of the pulley 59 is a hub 67 carrying a shutter 68 for operation as well understood in the art. The hub 67 and the shoulder 64 take all of the thrust exerted by the spring 63 whereby the shaft 56 as a whole is relieved from any end thrust.

Secured to the end of the driving shaft 21, and preferably substantially in line with the pulley 59 is a pulley 69 around which may pass a belt 70 for driving the pulley 59 from the drive shaft. By reason of this construction, it will be apparent that with the friction surfaces 60 and 61 in engagement rotation will be imparted to the shutter shaft 56 from the driving shaft 21, this rotation being effective not only for operating the shutter but also for obtaining the desired intermittent operation of the film feeding sprocket.

Cooperating with the sprocket 50 and normally occupying the position illustrated in Figure 1 of the drawings, is a stripping shield 71 carried by the inner end of a pin 72 supported in a suitable manner by a bearing 73 constituting part of the fixed gate section 42. Also secured to the shaft 72 is a pinion 74 with which meshes an arcuate rack 75 having a pivotal mounting 76 and operated simultaneously with the operation of the gate rod 48 by means of a pin 77 projecting outwardly from the gate opening rod and engaging a slot 78 in the extension 79 of the arcuate rack. With the construction just described, movement of the gate opening rod to the left as viewed in Figure 1 for the purpose of opening the relatively separable gate sections, will effect rotation of the rack in a counter-clockwise direction as viewed in this figure, thereby rotating the shield in a clockwise direction. This rotational movement of the shield will be effective for engaging the film f and stripping the same from the sprocket preparatory to the removal of the film from the apparatus. It will remain in this position covering certain of the teeth of the sprocket during the application of a new film or during rewinding, whereby the threading operation of the film is greatly expedited or the film protected during rewinding.

For further assisting the threading movement, the relatively fixed gate section 42 is provided with a projecting guide 80 having a generally curved contour for gradually feeding the film over the fixed gate section, the guide having a downwardly curved and inclined lower end 81 for insuring passage of the film over the sprocket and an upwardly inclined and curved upper end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower end 84 having a function corresponding to that of the curved end 82 of the guide member 80, and described in detail hereinafter. Projecting downwardly from the lower end of the movable gate section is a pair of spaced guide fingers 85 curved to generally conform to the curvature of the sprocket 50, the space between these fingers being sufficient to accommodate the teeth 51 of the sprocket.

In case a film is used with perforations along each edge, as has recently become common with sub-standard as well as theatrical films, a usual shoe, conforming to the curvature of the sprocket 50 and including relieved portions opposite the path of the teeth of the sprocket, may be attached to the lower end of the movable gate section, preferably by resilient means, this shoe taking the place of the above mentioned spaced guide fingers 85. These guides cooperate in a manner, as will be readily apparent from the drawings, to permit a film to be positioned between the gate members by merely moving the same laterally relative to its normal direction of travel through the gate. This greatly lessens the time required for threading a new film into position, and enables the operation to be performed satisfactorily by an unskilled operator.

It will be readily understood by those skilled in the art that our invention may be employed with any type of conventional film handling apparatus, including particularly that in which compensation for the difference between the character of movement of the mass of film upon the delivery and take-up spindles and that of the section thereof at the aperture is provided by the usual unsupported loops of slack film. We prefer, however, to make use of the tension control system of feeding which is described and claimed in the copending application of Charles Ulysses Bundick and Barton Allen Proctor, Serial No. 44,482, filed July 18, 1925 now Patent 1,944,022, owned by the assignee of this application. By so doing we entirely obviate the necessity of manually producing slack or loops as heretofore provided and at the same time employ the mechanism by which such result is accomplished for carrying out a very important part of the control operation. It will be readily understood, however, that this joint use of a portion of the mechanism of the Bundick and Proctor system of film feeding for its feeding and compensating purpose and likewise for completing the necessary control circuit, as is later described in detail, is merely a matter of convenience and, if desired, separate elements may be used.

The tension control system of feeding preferably includes film tensioning and auxiliary feeding means automatically operated by the film. It may include a braking surface 86, attached to the tension arm 88 by means of the member 86', preferably resilient, and adapted to cooperate with the braking drum 29 revoluble with the spindle 2. The tension arm 88 is pivoted upon a pin 89 and terminates to the right as viewed in Figure 4 in a film engaging member or film guide 90, preferably in the form of a flat spring, which extends through the opening 91 in the main frame F and into the track of the film. Similarly the braking shoe 87, which is adapted for cooperation with the braking surface 8 revoluble with the take-up spindle 2 is attached by means of the member 87', preferably resilient, to the curved lever 92 secured to a plate 93 loosely surrounding the boss 7a on the frame F whereby the plate as a unit may be rotated about the boss, such lever terminating in the film engaging member or film guide 94, preferably in the form of a flat spring which extends through the opening 95 in the frame F and into the film track. During the feeding of a film through the apparatus all of the parts occupy the position illustrated in Figure 1 while during the threading of a film into position or the removal of a film from the apparatus, the parts occupy the position illustrated in Figure 3. In this latter position it will be noted that the guide 94 occupies such a position with respect to the curved end 84 of the guide member 83 as to insure the passage of a film around the guide 94 automatically upon lateral movement of the film, while the guide 90 occupies such a position with respect to the inclined curved upper end 82 of the guide member 80 as to insure passage of a film over and around the guide 90 by the operation referred to.

As power is applied to the sprocket 50, the sprocket revolves and the film is pulled from the spindle 2, the arm 88 is depressed and energy is stored in the spring 96. This movement of the film may be cushioned by the operation of the flat spring 90. While the sprocket 50 is at rest, the spring 96 acts on the arm 88 to cause an amount of the film to be pulled from the spindle 2. The magnitude of the flat spring 90 may be so determined that it will assist in the above described auxiliary feeding operation. Upon the next rotation of the sprocket 50, the film is again fed forwardly, the portion necessary to compensate for the displacement caused thereby being the length of film previously pulled from the spindle 2 and such as at that moment is pulled from the spindle 2. This movement of the film f again moves the arm 88 to store power in the spring 96 which is used during the next period of rest of the sprocket 50 to pull more film from the sprocket 2, and the foregoing cycle is repeated throughout the entire period of operation.

In addition to the operation above described, the lever 88 and its associated parts perform a braking function. The lever 88 is normally swung in such direction as to bring the brake 86 into contact with the drum 29 by means of the spring 96. Due to the action of this spring, the brake 86 tends to prevent too free rotation of the rewinding shaft and thereby prevents the tension on the film becoming less than that required for proper feeding. In the event, however, of a tendency toward too great tension, the tension on the film causes the lever 88 to move in opposition to the action of the spring 96, thereby relieving the braking action of the brake 86 to a corresponding extent and reestablishing the predetermined tension on the film.

The operation of the arm 92, the yielding film pad 94, the take-up spindle 3 and the sprocket 50 is analagous to that of the elements between the sprocket 50 and the supply spindle 2 above described. As the sprocket 50 revolves, a portion of the film is moved forward. The resilient end of the spring arm 87' aided if desired by the resilient pad 94, holds the film constantly under tension. The spindle 3, yieldingly but continuously driven, pulls the film onward and coils it up. This operation tends to move the arm 92 against the pressure of the spring 87', and tends, also, to compress the flat spring 94. Thus, there is stored an amount of energy which is sufficient to move the film away from the sprocket and to maintain the tension upon the film f during the next period of rest of the sprocket 50. As the spindle 3 revolves during the period of rest of the sprocket 50, a direct pull upon the perforations of the film seated upon the teeth 51 of the sprocket is prevented by the cushioning effect of the spring 94 offsetting the frictional drive of the spindle 3.

In addition to the auxiliary feeding operation above described, the arm 87' with its associated parts performs a braking function.

The lower brake 87, is normally so positioned as to exert little braking action on the drum 8. In the event, however, of a tendency toward undue tension on the film between the feeding sprocket 50 and the reel carried by the driving spindle 3, the film will be effective to swing the lever 92 in such direction about its pivotal mounting 97 on the plate 93 as to bring the brake 87 into more effective braking engagement with the drum 8. Due to the fact that the spindle 3 is driven from the motor through a friction drive, such braking action will be effective for decreasing the driving force on the spindle 3, and consequently will relieve the tension on the film and produce the desired operating conditions between the sprocket and the lower reel.

The braking operation above described is of great usefulness where abnormal conditions of feeding arise, such for example as the binding of a shaft from any cause, as lack of lubrication or the intrusion of a piece of grit, or sudden acceleration or deceleration of the intermittent sprocket 50 owing to a sudden change in the voltage applied to the motor M or other temporary aberration characteristic of feeding. Applicants have been able successfully to feed film without the use of the braking means in addition to the primary tension controlling means but they prefer to use both means.

In the manner described required tension on the film to insure proper feeding is automatically secured by the mere threading of the film into position, and is automatically maintained by the operation of the tension or braking mechanism.

It will be readily understood that when our apparatus is used for the projection of still or stereopticon pictures, during the preliminary positioning of the film or its rewinding or when the film is stationary for any cause, it is desirable to protect the film from the heat which is emitted by the light source when of sufficient intensity to project a satisfactory motion picture. The use of the conventional heat shield has many obvious disadvantages. In the present invention, we reduce the amount of current reaching the light source. It has been proposed to break the circuit of the light source when the circuit of the motor is broken or through a double switch including both the motor and light switches to shunt resistance into the light circuit when the motor is inoperative. We do nothing of the sort. In order to provide ventilation at all times and for other useful purposes, we always operate the motor, which drives the ventilating fan, as will be later described. Through control mechanism which interlocks all of the operable elements of the apparatus, we operate the control element of the resistance, which is in circuit with the light source, in predetermined and timed relation to the operation of all the other operable elements of the apparatus. The mechanism which accomplishes this result is positive and absolute and leaves nothing to the memory or the discretion of the operator. As is illustrated in Fig. 11, we provide a variable resistance 234 one end of which is connected with the source of current 235, such source of current being in circuit with the light source through a conductor 236 which passes from the source of current to the light source and thereafter to a pivoted lever 129, later described in more detail. One end of this pivoted lever, as shown in Fig. 11, carries the wiper arm for the resistance, and its movement from the position shown in full line in Fig. 11 to that shown in dotted line progressively cuts resistance 234 into the light circuit instead of adding the extra resistance abruptly.

It is an important feature of our invention to protect the delicate filaments of the electric lamps used in projectors by providing means for cutting resistance into and out of the circuit of the lamps in a gradual manner as described above and as illustrated in Figures 11 and 20, instead of increasing or decreasing the resistance abruptly as has been done heretofore. By using such means the danger of the delicate filaments being injured by too sudden heating and cooling is eliminated.

In some cases, a heat shield 98' may be preferable to the resistance 234 for protecting the film from the heat of the lamp, and this shield can be mounted on a shaft 99 adjacent the lamp house funnel 311, and can be operated by means of the links 134 and 133 connected to the arm 129 as shown in Figures 13a and 13b and described in detail in our parent application. As will appear hereinafter, the shield is necessarily placed in protective position while the film is not being normally fed past the aperture 44, and is operated in timed relation to all other operable parts of the apparatus.

The present apparatus is especially suitable for repetitious showings of a film for advertising purposes, and by unskilled persons as is explained more fully in our parent application. To secure an automatic and as simple a control as possible there is preferably provided a single control member in the form of a knob or button 101 projecting upwardly through an arcuate slot 102 in the supporting base B. This slot may be so shaped as to provide four operating stations designated respectively, S1, S2, S3 and S4. The button 101 is adapted to be moved at will either manully so as to occupy any one of these stations, or automatically so as to occupy any of stations S1, S2 or S4. With this button at the station S1, the respective parts of the apparatus are in such position as to insure the normal projection of pictures as usual motion pictures.

With the control button at station S2, there is obtained a so-called still or stereopticon projection, the movement of the button from the station S1 to the station S2 being affected for disengaging the respective driving mechanisms which are in operation during the projection of pictures in motion. With the button in position at station S3, the respective parts of the apparatus are in such position as to permit the positioning of a film therein or the removal of a film which has just been fed therethrough. It will be understood that the movement of the button from station S2 to station S3 automatically produces the required change in the operating position of the parts. With the button in position at station S4, the respective parts of the apparatus are in such position as to permit rewinding of the film by means of the motor M. The movement of the button from station S3 to station S4 automatically produces the required change in operating conditions necessary for such rewinding. This provision of a single control member movable only in a predetermined manner and automatically effective upon movement for producing all of the necessary changes in operating conditions constitutes an important feature of the present invention, as it renders the control and operation of the apparatus extremely simple and substantially foolproof.

The control mechanism actuated either manually by the control knob or automatically as hereinafter set forth in detail, is to a large extent shown in Figures 7, 8, 9 and 10, inclusive, and diagrammatically in Figure 14, which illustrate in succession the change in the position of the parts of the control mechanism by movement of the control button successively to the respective stations, and the circuits by means of which the desired movements are produced. This mechanism may comprise a lever 103 keyed or otherwise secured to the lower end of a brake release rod 104 having its lower end journaled in any desired manner in the base B and its upper end journaled in a bearing bracket 105. Being secured to the brake release rod 104 which is capable only of a turning movement about its longitudinal axis, the lever 103 is restricted in its movements to rotation only. Carried by the rotating lever 103 is a combined sliding and rotating lever 106 having adjacent each end a slot 107 through each of which projects a headed pin 108 by means of which the combined sliding and rotating lever is effectively mounted on the rotating lever for rotational movement simultaneously therewith and sliding movement independently thereof. At its front end the lever 106 carries an upstanding pin 109 having a head 110 provided with an inwardly projecting pin 110' adapted to engage a bayonet shaped slot 111 in the pin 109. By reason of this construction it will be apparent that the button may be moved vertically on the pin 109 by a rotative movement thereof so that it may either occupy an upper or a lower position on the pin. At its lower end the button has a collar 113 of a diameter to substantially conform to the contour of the slot 102 at the respective operating stations, whereby with the button in its lower position accidental movement from one of these stations is prevented, while with the button in its upper position the parts are free for automatic operation independently of any operator.

At a point intermediate its ends the combined rotating and sliding lever 106 is provided with a transversely extending recess 114 adapted to cooperate with a pin 115 projecting from a lever 116 which is secured adjacent one end on a control sleeve 117 surrounding a control rod 118, the sleeve and rod extending upwardly through the base B and journaled for rotational movement in bearings 119 carried by the bracket 16 and by an upper bearing 120 carried by the bracket 33. Adjacent its upper end the control sleeve 117 has projecting therefrom forked operating arms 121 carrying projecting pins 122 adapted to normally lie in the groove 123 of the clutch member 62 on the shutter shaft 56. By reason of this construction it will be apparent that upon rotation of the sleeve 117 in a counter-clockwise direction, as viewed in Figure 7, the clutch members 60 and 61 will be disengaged, thereby destroying the driving relationship between the main drive shaft 21 and the shutter shaft 56.

At an intermediate point the control sleeve is also provided with a similar pair of arms 124 having pins 125 normally projecting into the groove 126 of the clutch collar 25. Rotation of the sleeve in a counter-clockwise direction as just described will be effective through the arms 124 for disengaging the driving spindle clutch to thereby permit the driving spindle to move freely in either direction. Engagement of the driving spindle clutch and the shutter shaft clutch will be effective for the so-called projection of pictures in motion but this engagement is not required for still or stereopticon results. This operation of the sleeve 117 is obtained by moving the control button from station S1 to station S2, or from the position shown in Figure 7 to the position shown in Figure 8, by reason of the relative movement imparted to the sleeve due to the sliding action of the lever 106.

Pivotally mounted adjacent the side of the combined sliding and swinging lever structure is a friction and positive detent 127. One end of this detent has connected thereto one end of a tension spring 128, the opposite end of which is secured to a suitable projection on the base B of the apparatus. The spring normally tends to swing the detent in a counterclockwise direction about its pivotal mounting as will be apparent from the drawings. This forces the upper end of the detent into frictional engagement with the sides of the levers 103 and 106, thereby tending to frictionally hold the same in any position to which they may be moved.

In changing from the normal projection to the projection of still pictures, it is necessary to diminish the amount of current reaching the light source. This is positively accomplished simultaneously or in timed relation to the rotation of the sleeve 117, through the medium of the previously mentioned lever 129 pivoted at its intermediate portion on a stud pivot 130 secured in the base B. At one end of the lever 129 is a slot 131, within which projects the pin 115 on the lever 116. At its opposite end the lever 129 includes the wiper bar previously described for the resistance 234. The opposite end of the lever 129 is curved to provide a recess, as clearly shown in the drawings, adapted to permit the desired operation of the detent 127 without interference therewith. Through the medium of the mechanism just described, the movement of the lever 106 from station S1 to station S2 will rotate the lever 129 in such direction as to cut a certain amount of resistance into the light circuit. It will be noted that this increase of such resistance takes place positively in timed relation to the movement of the operating parts necessary to obtain still projection and thereby eliminates any possibility of injury to a film while stationary.

It may be assumed that after the single projection of a film, or the repeated projection thereof, it is desired to change the same, or that in starting it may be necessary to move the parts of the apparatus into such position that a film may be threaded into position therein. Under such circumstances, the control button will be moved from station S2 to station S3. This movement will be effective only for rotating the brake release rod 104 and for bringing a recess 137 in the lever 106 into cooperative engagement with a pin 138, projecting upwardly from a lever 139, secured to the lower end of the control rod 118.

Figure 8:
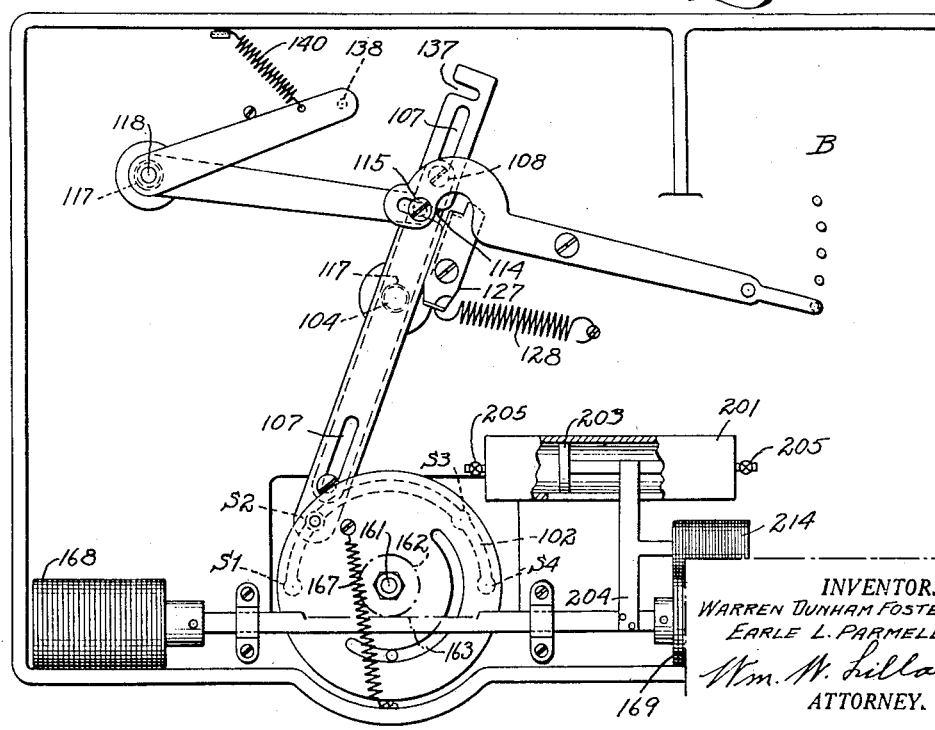
Figure 8 is a partial bottom plan view showing actuating levers in "still projection" position.

The lever 139 is normally held in the position shown in Figures 7, 8 and 9 by a tension spring 140, which may be secured in any desired manner to the base B of the apparatus. In this position, the pin 138 will be received by the slot 137 when the parts are rotated in the manner described. At the commencement of the movement from station S2 to station S3, the combined swinging and sliding lever structure will be moved away from the detent 127, thereby permitting it to swing in a counterclockwise direction under the influence of its tension spring. This movement will be effective for bringing the notched end of the detent into engagement with the projection 116' of the end of the lever 116, whereby the lever 116 and its associated parts will be held in the proper position.

The rotation of the brake release rod is effective for opening the gate sections of the gate, for moving the tension arms 86 and 87 and their associated parts to inoperative position and for so actuating the stripper shield 71 as to effect the desired stripping movement of a film from the sprocket 50 or the shielding of the sprocket to permit the threading of a new film into position. These operations are obtained by securing to the upper end of the brake release rod a pin 141 extending into a slot 142 in one arm of a bellcrank lever 143, having a pivotal mounting 144 on the back of the frame F. The opposite arm of the bell crank lever is in cooperative engagement with one end of a link 145 movable through a slide or guide 146 and having its upper end bent inwardly to extend over the tension arm lever 88. Movement of the control button from the station S2 to the station S3 will be effective for rotating the brake release rod 104 in a clockwise direction, as viewed in Figure 9, thereby rotating the bell crank lever 143 in a counterclockwise direction, as viewed in Figure 4, and consequently, rotating the tension arm lever 88 about its pivotal mounting 89 in opposition to the spring 96 for moving the tension arm 86 to inoperative position.

Movement of the lower tension arm is obtained simultaneously with actuation of the upper tension arm through the medium of a crank lever 147, secured at an intermediate point to the brake release rod. This crank lever has a slot 148 in its free end into which projects a downwardly extending pin 149 carried by the gate control rod 48. The right hand end of the gate control rod as viewed in Figure 3, is connected by a link 150 with the tension arm lever 92, whereby said tension arm lever and the gate control rod operate in unison. Movement of the brake release rod occasioned by operation of the control button from station S2 to station S3 is effective for rotating the parts 93 and all parts carried thereby in such direction as to lower the film guide 94 in the slot 95 and bring it into such cooperative relation to the guides 80 and 83 as shown in Figure 3, as to facilitate the removal of a film or the positioning of another film. This movement of the gate control rod will also tend to separate the gate sections and will move the shield 71 into stripping and shielding position, as will be obvious.

If it is not desired to change a film, as would be the case in advertising for example, the control button may be moved from station S3 to station S4, or may be moved from station S2 to station S4 without stopping at station S3. This movement will be effective by reason of the engagement between the recess 137 and the pin 138 for rotating the control rod 118. At its upper end, this control rod carries spaced arms 151, similar to the arms 121 and 124, previously described, and provided with pins 152, normally lying in the groove 153, in the rewinding clutch collar 36. The rotation of the control rod 118, as occasioned by the movement of the control button from station S3 to station S4, will be such as to move the rewinding clutch into operative position, whereby the spindle 2 is connected in driving engagement with the shaft 31, this engagement being such that the film may be rewound by the continued operation of the motor M.

During this time, the spring 140 will be held under tension in such manner that should an operator fail to completely position the button at the station S4, the spring will be effective for automatically restoring the parts to an inoperative position at station S3.

From the foregoing, it will be apparent that the operation of a single control button performs in succession the necessary changes in the operating positions of the various parts for permitting any desired condition of operation of the apparatus. Upon movement of the control button from station S4 to station S3, the rewinding clutch will be disengaged and the lever 139 held in position by the spring 140. Upon movement from the station S3 to the station S2, the recess 137 will leave the pin 138 and the brake release rod 104 will be rotated in the opposite direction to that heretofore described.

During this movement, the combined swinging and lever structure will come into engagement with the detent 127 and swing it in a clockwise direction against the action of its controlling spring, to thereby release the projection 116′ from the holding action of the detent, and permit the lever 116 and its associated parts to be subsequently moved as required, upon movement of the control button from station S2 to station S1. Such movement of the button will swing the lever 116 in the opposite direction to that previously described, and thereby effect re-engagement of the shutter clutch and of the driving spindle clutch. At the same time lever 129 will be restored to its original position, thereby, in turn, removing all of the resistance 234 from the light circuit.

Reference has heretofore been made to the adaptability of the apparatus to advertising or other purposes wherein repetitious showing of the film is desirable, and wherein for practical reasons, it is not feasible to have an operator in constant attendance. In such cases, the movement of the control parts may be automatically obtained merely by moving the control button 101 to its upper position on the pin 109 as before described. When in this position, there will be no holding or locking effected by the button so that all of the parts are free for automatic operation. Mechanism for this purpose is shown in Figures 7, 8, 9, 10, 12 and 14.

As shown in Figures 7 to 10, both inclusive, one form of mechanism may comprise a disk 160 having a pivotal or rotative support 161 on the base B. This disk has secured thereto the pin 109, whereby rotation of the disk will accomplish the same movement of the control mechanism as is effected by movement of the button 101. Such rotation may be obtained by providing a pinion 162, concentric with the support 161. Cooperating with this pinion is a rack 163, preferably of rectangular or angular cross section, whereby it may be effectively held in the desired operating position by means of guides 164 on the base B. Formed in the disk 160 is an arcuate slot 165 into which extends a stop pin 166, projecting downwardly from the base of the apparatus. The length of the slot is such that it will just permit enough rotation of the disk to move the pin 109 from station S1 to station S4 or vice versa; the stop pin positively stopping the disk in desired position at these stations. Accidental movement away from these stations may be prevented by the provision of a comparatively strong tension spring 167, having one end secured to the disk and the opposite end attached to the base B, the point of attachment to the disk being such that after the disk passes a midpoint between stations S1 and S4, the spring will be effective for assisting in completing such movement, the spring being placed under gradually increasing tension until such midpoint is reached.

It will be obvious to those skilled in this art that at this time, the spring 167 will effectively overcome the action of the spring 140, whereby after the button has been moved a distance far enough to effect the desired operation of the apparatus, the spring 167 will prevent return of the parts to neutral position at station S3.

For producing movement of the rack bar 163, it may be constructed either throughout, or may have end portions, of magnetic material adapted to act as cores for the solenoids 168 and 169. As viewed in Figures 7 to 10, it will be obvious that energization of the solenoid 168 will be effective for rotating the disk 160 in a clockwise direction, while energization of the solenoid 169 will effect rotation of the disk in the opposite direction. Thus, the solenoid 168 will be effective for moving the control mechanism from station S1 to station S4 to establish rewinding conditions, while the solenoid 169 will be operative at the conclusion of rewinding to re-establish projecting conditions.

The apparatus of the present invention may be advantageously used to show both motion pictures and still pictures, as for example by a lecturer in connection with his talk. Still pictures may be projected by moving the control mechanism to station S2 manually or by the means and method shown in the present case or by electrical means controlled as by the speaker at a distance from the apparatus. Such electrical means may include the core 213 of the solenoid 214, which core is connected to the upright arm 204 fastened rigidly to the rack 163, as illustrated in Figure 7. The solenoid 214 when energized will be effective for moving the disc 160 in a clockwise direction. The dimensioning of the core 213 with respect to the center of the magnetic field of the solenoid 214 is such that the solenoid will only be effective for moving the disc 160 a distance sufficient to bring the pin 109 to station S2, which is the station for still projection. The winding of the solenoid 214 may include a circuit (not shown) which may lead from the apparatus to a usual table placed near the above mentioned lecturer. A usual switch in the circuit will be normally open and upon closing it the speaker can energize the solenoid 214 and project still pictures whenever he desires. Upon releasing the switch and deenergizing the solenoid 214, the spring 167 will be effective to return the control mechanism to station S1, which is the station for projecting motion pictures.

In Figure 19 there is disclosed the solenoid 214 with circuit elements 226, 227 and 229 connecting the solenoid with the source of electricity 228. This circuit may be controlled by switch means including the parts 223 and 225. The switch means for controlling solenoid 214 may be held normally inoperative by a spring 224 and may be operated by means such as is described in our above noted senior application or, as is obvious, by manual operation. It can be readily seen by those skilled in the art of electricity that the above disclosed circuit of the solenoid 214 may be extended any desirable distance, such as, for example, from the apparatus to the above mentioned lecturer on a stage distant from the apparatus.

In usual forms of apparatus in which the film is not displaced from its usual path of travel during rewinding the problem of light control is extremely simple in both directions of travel of the film whether the rewinding be obtained through a friction drive or not. With the form of apparatus illustrated herein, however, this friction drive is extremely important in connection with the control by film tension at the conclusion of the rewinding operation. It will be apparent that the desired reversals in the direction of travel of the film are obtained without throwing any extra load onto the motor M. Its maximum duty, and therefore its size may thus be determined entirely by the projecting and rewinding operations, together with cooling as hereinafter described. This enables the use of a motor of minimum size and power consumption which may be continuously operated in one direction during the use of the apparatus.

As illustrated in Figure 15 the motor M may have a brake drum 190 which is engaged by a magnetic brake 191 under control of magnets or solenoids 192 and 193 connected respectively in parallel with control mechanism solenoids 168 and 169 through two auxiliary circuits each of which includes a movable armature piece 190'. As can be seen by those skilled in electric circuits, the armature piece 190' may be normally held by yielding means between two contacts 168' and 169' associated with the solenoids 168 and 169 respectively. The armature may swing by gravity in a vertical plane between the contacts 168' and 169' on a horizontal pivot 190'' as illustrated in Figure 15, or it may be normally held between the two contacts by opposed springs of well known construction. Upon the energizing of either of the solenoids, through the closing of the circuit 306—307 or the closing of the circuit 306'—307 as herein described, the piece 190' will be moved against the contact associated with the energized solenoid thereby energizing the associated brake-operating solenoid. The brake member driven thereby is thus applied and the speed of the motor and the film moving is reduced.

After the film has moved a short distance in rewinding direction, for example, the arm 88 will swing up and the main circuit of the solenoid 168 will be broken and the piece 190' will be moved away from the contact 168' thereby deenergizing solenoid 192 and releasing the brake and permitting the motor to operate at full speed for rewinding purposes.

Since it is also desirable to slow down the rotation of the sprocket 50 during its reengagement with the film, there is provided the magnetic means 193 which is operable for applying the brake as long as solenoid 169 is energized. As this solenoid may be retained in circuit until after normal projecting again commences, but is reenergized by such travel of the film, it will be apparent that the desired speed conditions are obtained at the exact time required.

Instead of utilizing a magnetic brake to accomplish the desired decrease in the motor and sprocket speed, this may be obtained by the arrangement illustrated for example in Figure 23 of the drawings in which the initial movement of the rack bar 163 in either direction cuts resistance 194 or 195 into the motor circuit by means of trips 196 and 197 which engage respectively resistance control fingers 198 and 199. As soon as the trips release the fingers, the springs 200 return the fingers to normal position. The trips 196 and 197 may obviously be adjustable on the rack bar for timing the exact period of cutting in resistance.

In addition to effecting slowing down of the sprocket speed, it may also be desired to produce an actual dwell between the disengagement of the driving spindle clutch and the shutter clutch, and the engagement of the rewinding spindle clutch, or vice versa. This may be accomplished by the provision of a suitable timing device herein shown for purposes of illustration only as comprising a dash pot 201 with which cooperate pistons 202 and 203 carried by a projection 204 on the rack 163. The dash pot, which may be of double construction, has a controllable one way acting release 205 for each end thereof whereby the speed of travel of the piston in either direction may be controlled, the length of slot 206 through which the projection 204 extends determining the time at which the dash pot first becomes effective in either direction. This is desirable as initially the rack bar should move at a high speed to effect disengagement either of the driving spindle clutch and shutter clutch, or disengagement of the rewinding spindle clutch, depending on the direction of travel of the rack bar. Thereafter, the dash pot becomes effective, and by the setting of the release valves 205, variably times the period of dwell before the concluding movement of the rack bar is accomplished. This variable timing is of importance, as it provides flexibility for different operating conditions, or films of different characteristics. It will be apparent to those skilled in the art that the dash pot may be of special construction having a variable speed of movement at different times, whereby it may have a gradually accelerating speed in either direction after a period of relatively slow movement.

In Figure 11 of the drawings there is illustrated a slightly modified form of the present invention by means of which it is possible to eliminate entirely the heat shield while still obtaining all of the advantages previously referred to. It will be apparent that since the object of a heat shield is to cut down the effective light concentrated on the film, it is possible to obtain all of the results and benefits obtained by a heat shield by merely varying the amount of resistance in the lamp circuit. For example, the amount of resistance may be increased during periods of still projection while the amount of resistance may be decreased during periods of normal projection. As illustrated in Figure 11 of the drawings, this may be obtained by utilizing the free end of the lever 129 as a rheostat arm directly cooperating with a resistance 234. This resistance is connected at one end with a source of current 235, the opposite side of which is connected to one terminal of the projecting lamp L. The opposite terminal of the projecting lamp may have a connection 236 with the lever 129. With the parts in normal projecting position the lever 129 will occupy the position illustrated in Figure 11 of the drawings in full lines, in which all of the resistance 234 is out of the lamp circuit, thereby providing a maximum available voltage for lighting purposes. With the parts in operative position at all of the other stations, however, the lever 129 will occupy the dotted line position shown in Figure 11 of the drawings, in which a considerable amount of the resistance 234 is effectively cut into the projecting lamp circuit. A decreased lamp intensity will therefore be available for periods of projection of still or stereopticon pictures, during the operations of threading or changing a film, and during the rewinding operation. In other words, there is a decided safety factor involved in this construction in that an operator always starts with a relatively dim light, it being impossible to change a film, or project still pictures under any other conditions. It will be understood that this figure of the drawings is largely diagrammatic, it being possible to position the resistance 234 at any desired point, as for example, in the lamp housing H wherein it will be under the influence of a blast of cooling air as will hereinafter be more fully apparent. The housing H is adapted to contain the combined lighting, resistance and ventilating units, and where desired the resistance 234 provided for the projecting lamp L. This lamp may be adjustably carried within the housing in any desired manner, as by bracket 282 having a pivotal mounting 283 in a bracket 284. Also having a pivotal mounting in the bracket 284 is a reflector R'.

Secured to one side of the housing H is a resistance carrying unit 285 having a suitable resistance for the lamp L. Also mounted on the housing, and preferably exteriorly thereof, is a second resistance 286 with which cooperates a control finger 287 by means of which the resistance may be cut into or out of the motor operating circuit at will.

The housing H at its lower end is preferable in spaced relation to the base B to permit the free circulation of air into the housing, and the top of the housing is closed by a slatted or louvre cover 288 permitting the egress of heated air from the housing. A positive circulation of cooling air through the housing is preferably continuously maintained in such manner as to be effective both on the lamp L and the lamp resistance 285, as well as the lamp resistance 234, where it is positioned within the lamp housing. This circulation may be maintained by means of a fan 289 of suitable construction mounted in the fan casing 290 and driven by an extension 291 of the armature shaft of the motor M.

In Figure 13, we have illustrated, more or less diagrammatically, a construction in which the cessation of motor operation, obtained for example, in a manner as hereinbefore set forth, will be effective for performing certain operations, such as moving the parts of the apparatus to inoperative position at station S2. This may be accomplished by providing the driving shaft 21 with a centrifugally operated switch 308. This switch may comprise a disk movable axially of the driving shaft, and normally urged to the left, as viewed in Figure 13, by a compression spring 309, movement in the opposite direction being effected by centrifugally operated means 310, as well understood. By reason of this construction, so long as rotation of the shaft 21 continues, the disk will be moved to the right in position to the spring 309, and out of engagement with the contacts 311 and 312, respectively. In the event that the shaft 21 ceases rotation, the disk will move to the left and establish a circuit through the coil 214, as will be apparent from the drawings, thereby automatically effecting movement of the parts to station S2. It will be apparent that a centrifugally operated switch of this general character might be utilized for obtaining any other desired control.

Where the shutter is stopped during periods of still projection it is necessary to insure means for stopping it in such position that it will not be in the path of projection of the picture being projected. It may also be desirable to stop both the shutter and the feeding sprocket in predetermined position during the rewinding of the film. Under certain conditions it may be desirable to stop the shutter so that a blade intercepts the cone of light so that no light appears upon the screen during the rewinding operation. Any of these results may be secured, as shown, for example, in Figure 18 of the drawings, by providing on the shutter shaft 56 a cam 237 with which cooperates a spring-pressed roller 238. If the disengagement of the shutter shaft should occur at a time when the roller is on one of the high points of the cam 237, it will be effective for rotating the shutter shaft, as will be obvious. The high points of the cam occupy a definite relation to the shutter blades, so that the rotation, if any, effected by the roller 238 will properly position the shutter.

In other cases, as illustrated, for example, in Figure 17 of the drawings, the same results may be obtained magnetically. This magnetic operation may be produced by providing on each shutter blade a button 239 of magnetic material, or permanently magnetized material. Carried by the frame F in such position as to cooperate with two blades of the shutter simultaneously, are magnets 240 adapted to attract the buttons 239 and thus properly position the shutter. If desired, the magnets instead of being permanent, may be connected in parallel with the solenoid 214, whereby during all periods when the solenoid 214 is effective for producing still projection, the magnets 240 will be energized.

It can be seen upon inspection of Figures 7, 16 and 18 that upon a small initial movement of the rack 163 by the solenoid 169 the speed of the motor M is instantly decreased because of extra resistance being thrown in the motor circuit. This takes place before the shutter and the intermittent feeding sprocket are disconnected from the driving mechanism and therefore their speed of rotation is checked. This reduction of the speed of the shutter is very beneficial since it permits the magnets 240, for example, to be smaller, to stop the shutter quicker and do it with less strain on the shutter and the intermittent cam and star and their associated parts, which are the most delicate and expensive in the apparatus.

The energization of the respective solenoids at predetermined time intervals may obviously be accomplished automatically in a number of different ways. Certain of such ways are described and claimed in the above-mentioned parent application, Serial Number 105,159, filed April 28, 1926, notably the use of light passed through the film, as it is moved through the apparatus, and impinging upon a photo-electric or other suitable cell and thereby producing electrical variations which are used to actuate all of the operable elements of the apparatus in the desired relations. The present application claims the use of the tension of the film, as it is moved through the apparatus, for controlling the mechanisms which actuate the operable elements. It will be readily understood by those skilled in the art that the tension controlled actuating mechanisms claimed in this application may be advantageously combined with the light-controlled actuating mechanisms described and claimed in the parent application. For example, the feeding operation might be stopped and re-started, for the purpose of showing successive still pictures, by the light controlled means of the parent case and reversal accomplished by the tension-controlled means claimed herein. For further example reversal after the feeding operation might be accomplished by the means claimed herein and reversal after the rewinding operation by the means shown in the parent case, or vice versa.

It will readily be understood by those skilled in the art that the control of the operable elements of the film handling apparatus by means of electrical circuits which are actuated by the tension of the film makes it possible so to construct the apparatus that much less strain is placed upon the film than would be the case if the control mechanism were to be operated directly by the tension of the film instead of through the agency of electrical circuits which can be made and broken by a very slight change in film tension. For certain types of apparatus, however, it is satisfactory to control the operation of the machine directly by mechanical connections operated by film tension and such control is within the scope of our invention.

In Figures 12 and 14 there are illustrated means by which the tension of the film may be utilized for actuating the control mechanism for actuating the various operable elements of the apparatus. As indicated in Figure 12, the upper tension arm 88 when drawn to its lowermost position by tension of the film engages the right-hand contact 305 as viewed in Figure 12, which contact may be yieldingly mounted on a spring member 305' and be connected by the wire 306 to one side of a suitable source of electric current, the opposite side of which is connected to one terminal of the solenoid 169. The opposite side of the solenoid is connected by a wire 307 to a suitable point on the tension arm 88. For the sake of clarity in the drawings this point is indicated in Figure 12 as being positioned on the right end of the arm 88, but it will be understood by those skilled in electrical circuits that the wire 307 may be joined to the arm 88 nearer its pivot and a suitable insulated conductor member may extend between the end of the wire 307 and the contact 305. Or a suitable switch of any well known kind which is operable by the movement of the arm 88, may be employed. By similar construction to that described above in this paragraph, the solenoid 168 may be connected in an electric circuit one element of which is the left-hand contact 305 as viewed in Figure 14.

For reasons which have already appeared, electrical means M' may be bridged across the terminals of the solenoids 168 and 169. The means M' may include conventional electro-magnet switch devices of well understood construction which need not be described here and which will operate upon closing the circuits of the solenoids 168 and 169 separately to short circuit, i. e. disable the solenoids 168 and 169 alternately. Thus at any time the circuit closing arm 88 is moved into engagement with the contacts 305, one of the solenoids 168, 169 will be energized and the other will be disabled. The next time the tension arm is moved into engagement with the contacts 305, the last energized solenoid will be disabled and the other energized. Upward movement of the tension arm 88 when film feeding or film rewinding begins will be effective to de-energize both solenoids.

In Figure 12, the parts are shown as when the rewinding of the film has just been completed and the feeding of the film for projection purposes is about to be started. The solenoid 169 being then energized, will move the control mechanism to the S1 position (see Figure 7) and normal feeding of the film for projection purposes will result. It will be understood that the circuits in Figure 14 are so shown in that figure for the sake of clarity. It can be readily seen by those skilled in electric circuits that the circuits of Figure 14 can be so arranged that only one source of power one member M' and one contact 305 will be required.

Under certain conditions of operation, it may be desirable to actuate the film intermittently at a slower speed than that possible with the motor M, to obtain in effect the projection of a succession of pictures as still or stereopticon pictures. This may be accomplished by the provision of a supplemental driving means for the shutter shaft, and is illustrated more particularly in Figures 2 and 5. This auxiliary driving mechanism comprises a shaft 320 mounted in bearings on the back of the frame F. At its lower end this shaft carries a bevel gear 322 adapted to mesh with a similar gear 323 on the shutter shaft 56. Normally, the gears 322 and 323 are maintained out of engagement by means of a compression spring effective for moving the shaft 320 upwardly. At its upper end this shaft carries a knurled actuating nut or knob 321 which may be grasped at will by an operator, thereby enabling him to bring the gears 322 and 323 into engagement for the slow rotation of the shutter shaft. At this time, it will be understood that the control button will occupy a position at station S2.

It can be readily seen that the above described mechanism will function for reversing the feed of the film or stopping the operation of the apparatus regardless of whether the film is fed over the guide member 90 under tension or not. Should the film not be fed under tension, as when a loop is used, the member 97 will be normally disposed a little farther away from the contact 305, but when the tension in the film is sufficient the member 97 will be moved against the contact in exactly the same way as described above. It will be understood that the member 97 on the arm 88, while the film is moving normally in either direction, will always be held away from the contact 305 by the spring 96.

It can be readily seen that if desired a circuit and a contact similar to the contact 305 and its circuit may be arranged for cooperation with the lower tension arm 92 to control the solenoids 168 and 169. In Figure 2, is diagrammatically shown a contact 305" which may be in a circuit with the solenoid 168 and is positioned for cooperation with the tension arm 92. In some cases as when feeding of the film is delayed by defective perforations and patches the arm 92 may be drawn into engagement with its contact 305" and energize the solenoid 168 before the upper arm 88 is affected, thus more quickly protecting the film, since the energizing of the solenoid 168 will serve to stop the film feeding operation and remove the film from the teeth of the sprocket 50 before the film becomes damaged.

If desired, the tension arm 88 may cooperate with the circuit 307', in Figure 12, which circuit may include electrically operable means the work condition of which it is desired to change when the tension on the film becomes excessive. For example, the circuit 307' may include the motor which drives the apparatus in cases where cessation of motor operation under predetermined film tension was desirable. To make use of arm 88 in connection with the circuit 307', as described above, the arm may be disposed in its uppermost position to rest against a contact of the circuit 307', which contact will preferably be yieldingly mounted.

In some cases it will be preferable to have the arm 88 when in its uppermost normal film feeding position, disposed slightly below the contact of the circuit 307', which circuit will then be normally maintained open and the electric means in it, which may be a relay N', will be ineffective. With this construction, should the film break at any time while being fed over the member 90, a spring (not shown) corresponding to the spring 96, will swing the arm 88 upwardly against the contact of the circuit 307' and render the relay N' effective for opening or closing the circuits of such electrical mechanisms it may be desired to control by the relay. For example, the light of the lamp can be reduced, the film feed stopped and a signal sounded upon the breaking of the film. In many cases, it will be desirable to have the relay N control the solenoid 214 for energizing it upon the breaking of the film. This will stop the film feeding mechanism and protect the film from the heat of the light source.

Throughout the foregoing description, reference has been made to projecting apparatus. It will be apparent, however, that many portions of the apparatus are inherently capable of use for regular photographic purposes in the taking of pictures.

Certain of the advantages of the present invention have been pointed out in the foregoing portions of this specification and will be clear from the subjoined claims.

Other advantages arise from the provision of an apparatus for the repetitious display of a film in which the desired operating cycles are automatically obtained by the tension of the film itself and under such conditions that the possibility of injury to the film or extra load is materially reduced.

Other advantages arise from the provision of improved automatic control means for actuating and governing the various operable parts of the film handling apparatus.

Other advantages arise from the provision of means whereby the failure of the film to feed properly between the delivery reel and the aperture or between the aperture and the take up reel is utilized to operate control mechanism which will prevent injury to the film. Lack of proper feeding movement in relation to the intermediate feeding member will cause the film to move out of its usual work path to one side or the other, and a predetermined departure of the film from its work path results in the closing of an electric circuit which actuates the control mechanism. It is a feature of the present invention to provide means which will secure the desirable result mentioned above in this paragraph without putting an extra strain on the film while it is being normally fed or a sudden severe strain on the film when the control mechanism is operated. Devices proposed heretofore for accomplishing the results mentioned above in this paragraph have caused an extra strain on the film while it was being fed in the usual way, or a sudden strain on the film when the devices were operated.

Further advantages arise from the control of the resistance placed in circuit with the light source in interlocked, timed and automatic relation to the control of all of the other operable elements of the apparatus.

Still other advantages arise from the provision of improved control means actuated by film tension and effective for automatically obtaining any desired condition of operation or control of a photographic or other film handling apparatus.

Still further advantages of the present invention reside in its usefulness in the operation or control of associated circuits, machines, devices, or the like.

We claim:

1. In a film handling apparatus, means for feeding a film, driving mechanism for said feeding means, operable film stripping means mounted for cooperation with said feeding means for bodily removing the film from said feeding means, means for decreasing the speed of operation of said driving mechanism, sequential control means operatively interconnecting said speed decreasing means and said film stripping means for decreasing the speed of operation of said driving mechanism and thereafter operating said film stripping means, and means responsive to the tension of the film for operating said control means.

2. In a film handling apparatus, a film supporting member, means for applying power to said supporting member whereby a film supported thereby is moved, a toothed member for moving the film supported by said supporting member, operable means for rendering the teeth of said member ineffective upon the film, control means interconnecting said power applying means and said operable means for controlling the operation of both of said means, and means responsive to change in the tension of the film for operating said control means.

3. In a film handling apparatus, means for feeding a film, driving mechanism for said feeding means, means for changing the speed of operation of said driving mechanism, operable film stripping means cooperating with said feeding means for bodily removing the film from said feeding means, sequential control means operatively interconnecting said speed changing means and said film stripping means for first operating said speed changing means and thereafter operating said stripping means, and an electrical circuit controlled by the tension of the film for actuating said control means.

4. In a film handling apparatus, a gate, means for feeding a film in a feeding direction through said gate, a source for projecting light through the film while it is being fed through said gate, means for feeding the film in an opposite direction, control mechanism interconnecting both of said feeding means and operable for rendering said feeding means alternately operative, a prime mover for operating said interconnecting means, and means responsive to change in the tension of the film for applying said prime mover to said control mechanism for actuating the same.

5. In a film handling apparatus, means for moving a film through the apparatus in one direction, means for moving the film through the apparatus in the other direction, control mechanism operatively interconnecting said moving means for rendering said moving means alternately operative, magnetic means for operating said control mechanism, an electric circuit for actuating said magnetic means, and film engaging means responsive to change in the tension of the film for controlling said circuit.

6. In a film handling apparatus, a gate, continuously operating driving mechanism, a rewinding spindle, a clutch for connecting said driving mechanism and said rewinding spindle for moving a film through said gate in a rewinding direction, a taking up spindle for moving the film through said gate in a feeding direction, a clutch for connecting said driving mechanism and said taking up spindle, control means interconnecting said clutches and operable for rendering said taking up spindle clutch inoperative and said rewinding spindle clutch operative, and means actuated by change in the tension of the moving film for operating said control means.

7. In a film handling apparatus, a rewinding spindle and a taking up spindle between which a film extends, a clutch for applying power to each of said spindles, control mechanism interconnecting said clutches for alternately rendering one operative and the other inoperative, magnetic means including a circuit for operating said control mechanism, and a film-engaging member actuated by change in the tension of the film for controlling said circuit.

8. In a film handling apparatus, a rewinding spindle, a clutch for said rewinding spindle, a taking up spindle, a clutch for said taking up spindle, a member for intermittently feeding the film from said rewinding spindle toward said taking up spindle, means for rendering said feeding member inoperative upon the film, and means operatively interconnecting said clutches and said last previously mentioned means and actuated by change in the tension of the film for first rendering inoperative said rewinding spindle clutch, rendering inoperative said means for rendering said feeding member ineffective upon the film and rendering operative said taking up spindle, whereby the film is fed in a projecting direction through said apparatus, and thereafter rendering inoperative said taking up spindle clutch, rendering operative said means for rendering said feeding member ineffective upon the film and rendering operative said rewinding spindle clutch, whereby the film is rewound.

9. In a film handling apparatus, a film moving member, mechanism for driving said member to move a film in a given direction, a clutch for connecting said moving member and said driving mechanism, electrical means including a circuit for operating said clutch, means other than said member for moving the film in a direction opposite that in which it is moved by said above mentioned member, means made effective by an increase in the tension of the film as moved by said other moving means for operating said circuit, and means for stopping the operation of said other moving means as said circuit is operated.

10. In a film handling apparatus, a plurality of members for moving a film, a clutch for each of said members, and control mechanism for operating said clutches, said control mechanism including connective devices movable into one position, wherein they are connected to one of said clutches and effective for operating said clutch, and movable to another position, wherein they are connected to another of said clutches and effective for operating said last named clutch, means for moving said devices between said positions, means responsive to the tension upon the film for operating each of said clutches through said devices after said devices have been moved into operative relation with said clutches.

11. In a film handling apparatus, a plurality of members for feeding a film and control mechanism for said feeding members, said control mechanism including a clutch for each of said feeding members, separate means to operate each of said clutches, connective means successively movable into operative relation with each of said clutch operating means, and means responsive to the tension of the film for operating each of said clutches through said connective means after said connective means have been moved into operative relation with said clutch.

12. In a film handling apparatus, two members engaging a film for feeding it in the same direction for regularly advancing the film, mechanism for driving said feeding members, sequentially operable means for successively applying the power of said driving mechanism to said feeding members first to one and then to the other thereof, and means responsive to the tension of the film for operating said sequential power-applying means.

13. In a film handling apparatus, two members engageable with a film for feeding it in the same direction, means for rendering one of said feeding members operative to feed the film, means for rendering the other of said feeding members operative to feed the film in the same direction as that in which it is fed by said first feeding member, sequentially operable means for successively operating each of said means first one and then the other, and means responsive to the tension of the film for actuating said sequentially operable means.

14. In a film handling apparatus having a plurality of operable parts, an apertured gate through which a film is moved, a shutter for cooperating with the film at the aperture of said gate, mechanism for driving said shutter, means for disconnecting said shutter from said driving mechanism while leaving others of said operable parts connected to said mechanism whereby said shutter is freed from the momentum of said other operable parts, and means responsive to change in the tension of the film for operating said disconnecting means.

15. In a film handling apparatus, an apertured gate through which a film is moved, a shutter for cooperating with the film at the aperture of said gate, mechanism for driving said shutter, means for disconnecting said shutter from said driving mechanism leaving it free for movement independently of said driving mechanism, means responsive to change in tension of the film for operating said disconnecting means, and means driven by said mechanism for moving the film while said shutter is disconnected.

16. In a film handling apparatus, an apertured gate through which a film is moved, a moving shutter cooperating with the aperture of said gate, mechanism for driving said shutter, means for disconnecting said shutter from said driving mechanism, means for reconnecting said shutter and said driving mechanism, means for moving the film past said aperture while the shutter is disconnected, and means actuated by change in the tension of the film as so moved past said aperture for operating said reconnecting means.

17. In a film handling apparatus, an intermittent feeding member, driving mechanism for said intermittent member, means for disconnecting said intermittent member from said driving mechanism, means for maintaining said intermittent member in predetermined position while disconnected, and means responsive to change in the tension of the film for operating said disconnecting means.

18. In a film handling apparatus, means for feeding a film intermittently, a member for taking up the film, a shutter connected to said feeding means for cooperative movement therewith, a source of power, a clutch operable for disconnecting said shutter and said feeding means from said power, a separate clutch operable for disconnecting said taking up member from said power, means cooperating with said shutter for stopping said shutter and said feeding means in predetermined relation to the optical axis of said apparatus after the disconnection of said clutches, control mechanism operatively interconnecting said clutches and said means for predeterminedly stopping said shutter and said feeding means and effective for operating said clutches and said means, and an actuating member for said control mechanism operated by change in the tension of the film.

19. In a film handling apparatus, a member for feeding a film, mechanism for driving said feeding member, mechanism for disconnecting said driving mechanism from said feeding member, an openable gate through which the film travels, control means interconnecting said disconnecting means and said openable gate for operating said disconnecting means and opening said gate, and means made effective by a failure of said feeding member to advance the film during the continued operation of said driving mechanism for actuating said control means for operating said disconnecting means and opening said gate whereby said mechanism and said feeding member are disconnected and said gate is opened.

20. In a motion picture projector, means for moving a film in one direction for projecting successive images therefrom, means for moving the film in another direction for rewinding the film, driving means for said film moving means, mechanism interconnecting said moving means and said driving means for rendering said means selectively effective upon said moving means, manual means for operating said mechanism for initiating the operation of one of said film moving means by connecting it to said driving means, and means controlled by the tension of the film as it is being fed by said moving means which has been set in motion by said manual means for stopping the operation of said last previously mentioned moving means and initiating the operation of said other mentioned moving means.

21. In a film handling apparatus through which a film may be moved, a continuously moving delivery member, a continuously moving taking up member, means for intermittently feeding the film from said delivery member toward said taking up member, means for compensating for the differences in character of movement of said members and said feeding means, operable mechanism for initially positioning said compensating means and the film in operative relation one with the other, and means actuated by change in the tension of the moving film for operating said mechanism.

22. In a film handling apparatus, a continuously operating film-supporting member and an intermittently operating film-feeding member between which a film extends, a film-engaging member movable between one position wherein it defines one side of a relatively short path between said members and another position wherein it defines one side of a relatively long path between said members, means for moving said path-defining member from one of said positions to the other, an electrical circuit for operating said moving means, and means actuated by change in the tension of the film for controlling said circuit.

23. In a film handling apparatus, a continuously operating film-supporting member and an intermittently operating film-feeding member between which the film extends, a film-engaging member movable between a first position wherein it defines one side of a relatively short path between said members and second position wherein it defines one side of a relatively long path between said members, means for moving said path defining member from the second of said positions to the first thereof, and means actuated by change in the tension of the film for operating said moving means.

24. In a film handling apparatus, a continuously operable film supporting member and an intermittently operating film feeding member between which a film extends, a member engaging the film between said continuous member and said intermittent member and movable to a position wherein it increases the length of film therebetween, and means actuated by change in the tension of the film for moving said member to said position.

25. In a film handling apparatus through which a film may be moved, a film supporting member, means for moving a film supported by said member, braking means operated by the film cooperating with said member, operable mechanism for initially positioning the film and said braking means in operative relation one with the other, and means responsive to change in the tension of the moving film for operating said mechanism for initially positioning the film and said braking means in operative relation one with the other.

26. In a film handling apparatus through which a film may be moved, two film-supporting members between which a film extends, a bodily movable spring loaded member for controlling the tension of the stretch of film between said members, operable control means for bodily moving said tension member into cooperative relation with the film for the purpose of making possible the initiation of the film-tensioning operation, and means responsive to change in the tension of the film for operating said control means.

27. In a film handling apparatus, a member for feeding a film, a member for taking up the film as it is fed by said feeding member, driving mechanism for said taking up member, means for disconnecting said driving mechanism from said taking up member, a brake for slowing down said driving mechanism and said taking up member preparatory to their disconnection whereby the momentum of said taking up member and the film carried thereon is reduced, sequential control means operatively interconnecting said brake and said disconnecting means for first actuating said brake and thereafter actuating said disconnecting means, and means responsive to change in the tension of the film for operating said control means.

28. In a film handling apparatus, means for moving a film in one direction, means for moving the film in the other direction, a motor for driving both of said moving means, a circuit for said motor resistance adapted to be added to said circuit, means for adding said resistance to said circuit whereby the current reaching the motor is decreased in relation to that previously reaching said motor, means for rendering said moving means alternately operative, and common control means operated by change in the tension of the film and operatively interconnecting said means for rendering said moving means alternately operative and said means for adding said resistance to the circuit of said motor for operating both of said means.

29. In a film handling apparatus, means for feeding a film through said apparatus, a light source, means for protecting the film from the heat of said light source, means for reducing the speed of operation of said feeding means, control means operatively interconnecting said protecting means and said speed reducing means, and means responsive to change in the tension of the film for operating said control means whereby said protective means is rendered operative during the feeding of the film at reduced speed.

30. In a film handling apparatus, means for moving a film in one direction in said apparatus, means for moving the film in the other direction, control means interconnecting said moving means for rendering said moving means alternately operative, a light source, means operatively connected to said control means for decreasing the light reaching the film while the film is being moved in one of said directions, and means responsive to the tension of the moving film for actuating said control means.

31. In a film handling apparatus, means for feeding the film through said apparatus, a light source, means for increasing the light from said source effective upon the film, powered means for operating said light increasing means, and means controlled by change in the tension of the moving film for actuating said means operating said light-increasing means.

32. In a film handling apparatus, an aperture, a source of light cooperating with said aperture, a first film-supporting member, a second film-supporting member, means for feeding a film along an indirect work path from said first supporting member past said aperture to said second film supporting member, means operable for reducing the heat reaching said film from said light source, powered means for operating said heat reducing means and means ineffective to increase the normal work tension of the film actuable by excessive departure of the film in either direction from its normal work path between said film supporting members for actuating said means for operating said heat reducing means.

33. In a film handling apparatus, an aperture, a source of light cooperating with said aperture, a film-supporting member, means for feeding a film in a vertical plane along a work path from said film-supporting member past said aperture, means operable for reducing the heat which reaches the film from said light source, means for operating said heat reducing means and means ineffective to increase the normal work tension of the film actuable by predetermined movement of the film in said plane on either side of said work path for actuating said means for operating said heat reducing means.

34. In a film handling apparatus, a member for feeding a film, driving mechanism for said member, a clutch for connecting and disconnecting said feeding member and said driving mechanism, an electrical source of light cooperating with the film, a variable resistance, means for connecting said resistance in the circuit of said light source including a wiper arm engaging said resistance, and mechanism interconnecting said clutch and said wiper arm whereby the disconnection of said driving mechanism from said feeding member will necessarily operate said wiper arm to place resistance in the circuit of said light source.

35. In a film handling apparatus, a member for moving a film, means for initiating the operation of said member, a filamented lamp for passing light to said film, a gradually operable variable resistance in circuit with said lamp, and control mechanism operatively interconnecting said means for initiating the operation of said feeding member and said variable resistance for gradually increasing the amount of current reaching the filament of said lamp upon the initiation of said feeding member whereby said filament is protected against injury resulting from sudden change in temperature.

36. In a film handling apparatus, a member for feeding a film, means for initiating the operation of said feeding member, an electric lamp for passing light to said film as fed by said member, a gradually operable variable resistance in the circuit of said lamp, control mechanism operatively interconnecting said means for initiating the operation of said feeding member and said variable resistance for gradually increasing the resistance in circuit with said lamp as the operation of said feeding member is initiated, and means actuated by the tension of the film for operating said control mechanism.

37. In a film handling apparatus, means for moving a film through said apparatus in one direction, means for moving the film through said apparatus in the other direction, a light source cooperating with the film, a variable resistance in circuit with said light source, means for operating said variable resistance whereby the amount of current reaching said light source is gradually changed, and control means interconnecting both of said moving means and said means for operating said variable resistance for rendering said moving means alternately operable and operating said variable resistance in timed relation to such alternations.

38. In a film handling apparatus, means for moving a film through said apparatus in one direction, means for moving the film through said apparatus in the other direction, a light source cooperating with the film, a variable resistance in circuit with said light source, means for operating said variable resistance whereby the amount of current reaching said light source is gradually changed, control means interconnecting both of said moving means and said means for operating said variable resistance for rendering said moving means alternately operable and operating said variable resistance in timed relation to such alternations, and means responsive to the tension of the film for operating said control means.

39. In combination with a film handling apparatus and its motor, a safety device including a heat shield, a control mechanism including an electro-magnet device for controlling said heat shield, a film actuated switch controlling said electro-magnet device, and a supplementary centrifugal switch controlled by said motor and connected in parallel with said electro-magnet device.

40. In combination with a film handling apparatus and its motor, a source of light, a safety device including means for protecting the film from said source of light, a control mechanism for said means including an electro-magnet device and film actuated switches controlling said electro-magnet device, and a supplementary centrifugal switch controlled by said motor and operatively connected to said electro-magnet device.

41. In a film handling apparatus, a first film supporting member, a second film supporting member, said supporting members being disposed in said apparatus to permit a film being moved between them, a film engaging member movable for increasing the length of stretch of film between said film supporting members, means for moving said length increasing member whereby said stretch is increased, and means actuated by change in the tension of the film for operating said means for moving said length increasing member.

42. In a film handling apparatus, a member engaging a film for maintaining a predetermined condition of tension thereupon, mechanism for moving said member out of operative engagement with the film, and means actuated by change in the tension of the film for operating said mechanism.

43. In a film handling apparatus, a feeding member for a film, means for bodily moving the film out of engagement with said feeding member, means for operating said moving means, means for necessarily changing the speed of operation of said feeding member preparatory to the operation of said means for bodily moving the film out of engagement with said feeding member, and means actuated by change in the tension of the film for actuating said speed changing means.

44. In a film handling apparatus, a toothed member for feeding a film, means for driving said feeding member, means for bodily moving the film out of engagement with the teeth of said member, control means operatively interconnecting said driving means and said bodily moving means for first changing the speed of operation of said driving means and thereafter operating said means for bodily moving the film from engagement with said member, and means actuated by change in the tension of the film for actuating said control means.

45. In a film handling apparatus, a first means for feeding a film in one direction, a second means for feeding a film in the other direction, actuable control means operatively interconnecting said first and second feeding means and effective for rendering said first feeding means inoperative and said second feeding means operative and assuring a predetermined period between the cessation of operation of said first means and the beginning of operation of said second means, and means controlled by change in the tension of the film for actuating said control means.

46. In a film handling apparatus, mechanism for feeding a film in one direction, mechanism for feeding the film in the opposite direction, driving means for both of said mechanisms, control means for rendering said mechanisms alternately operable, and means operatively connected with said control means and actuated by change in the tension of the film for changing the speed of said driving means prior to the initial cessation of operation of the first named feeding mechanism and the beginning of operation of the other feeding mechanism.

47. In a film handling apparatus, mechanism for feeding a film in one direction, mechanism for feeding the film in the other direction, driving mechanism for said feeding mechanisms, means for rendering said feeding mechanisms alternately operable, means for reducing the speed of operation of said driving means, and control means actuated by change in the tension of the film and interconnecting both of said previously recited means for operating them.

48. In a film handling apparatus, means for moving a film in one direction, means for moving the film in the other direction, a motor for driving both of said film-moving means, resistance connectible in the circuit of said motor, operable means for connecting said resistance in said circuit, control means operatively interconnecting both of said film-moving means and said means for connecting resistance in said motor circuit for operating said film-moving means alternately and for operating said means for connecting resistance in said motor circuit in timed relation to such alterations, and means actuated by change in the tension of the film for actuating said control means.

49. In a film handling apparatus, a rewinding member for a film, a taking up member for the film, a first source of power, means for operatively connecting each of said members with said first source of power, control means operatively interconnecting said connecting means for alternately operating each of said connecting means, a second source of power for operating said control means, and means actuated by change in the tension of the film for applying said second source of power to said control means whereby said control means is operated.

50. In a film handling apparatus, a member for feeding a film, driving mechanism for said feeding member, operable means for operatively connecting said member and said driving mechanism, means operable for temporarily reducing the speed of said driving mechanism, sequential control means operatively interconnecting said speed reducing means and said connecting means for operating said speed reducing means before the operation of said connecting means, and means actuated by change in the tension of the film for actuating said control means.

51. In a film handling apparatus including a plurality of operable parts, an intermittent feeding member, a shutter operatively connected to said intermittent member for cooperative movement therewith, means for disconnecting said intermittent member and said shutter from the remainder of the operable parts of the apparatus, means for stopping said intermittent member and said shutter in predetermined relation to the optical axis of said apparatus after they have been disconnected, and control mechanism actuated by change in the tension of the film for operating said stopping means.

52. In a film handling apparatus, a member for feeding a film intermittently, a member for taking up the film as it is fed by said intermittent member, a shutter, means operatively interconnecting said intermittent feeding member and said shutter for driving said intermittent member and said shutter in cooperative and timed movement, a source of power for said driving means and said taking up member, positively controlled means for disconnecting said driving means from said source of power while leaving said taking up member with the mass of film supported thereby operatively attached to said driving means, means for predeterminedly stopping said shutter and said feeding means after they have been disconnected from said driving mechanism, whereby said parts are freed from the strain which would follow the sudden stopping of the take-up member while connected thereto and the mass of film supported thereupon, and means actuated by change in the tension of the film for actuating said disconnecting means.

53. In a film handling apparatus, a member for feeding a film, mechanism for driving said feeding member, a motor for operating said mechanism, resistance connectible in the circuit of said motor, means for connecting said resistance in said circuit, a light source for cooperating with the film, means for protecting the film from the heat of said light source, control mechanism interconnecting said resistance connecting means and said protective means for rendering the latter operative when said resistance is connected in the circuit of said motor, and means actuated by change in the tension of the film for actuating said control mechanism.

54. In a film handling apparatus, a gate comprising a plurality of sections, mechanism for moving one of said sections relatively to another, a first member for moving a film through said gate, a second member for moving the film therethrough, and means controlled by change in the tension of the film while being moved by said first member for operating said gate-moving mechanism and actuating said second moving member.

55. In a film handling apparatus, mechanism for feeding a film in one direction, mechanism for feeding the film in the other direction, a source of light cooperating with the film, means for protecting the film from the heat of said light source, means for reducing the speed of operation of one of said feeding mechanisms preparatory to the operation of the other of said mechanisms, control mechanism operatively connecting said protecting means and said reducing means effective for operating said protecting means and said reducing means, and means actuated by change in the tension of the film for actuating said control mechanism.

56. In a film handling apparatus, a first mechanism for feeding a film in a projecting direction, a second mechanism for moving the film in a rewinding direction, a prime mover for driving said mechanisms, reversing mechanism for alternately actuating said mechanisms for determining the direction of travel of the film, control means for said reversing mechanism, two prime movers for operating said control means, one of said prime movers operating said control means to make effective said first named feeding mechanism, the other of said prime movers operating said control means to make effective said second named feeding mechanism, and means responsive to change in the tension of the film for alternately actuating said prime movers.

57. In a film handling apparatus, a light source for cooperation with a film, means for varying the amount of light from said light source effective upon the film, means for feeding the film through light from said source, control means including a movable member having an operative connection with said feeding means and said light varying means for rendering said feeding means successively operative and inoperative and for concomitantly operating said varying means to decrease the light from said light source when the feeding means is inoperative, and means responsive to change in the tension of the film for operating said control means.

58. In a film handling apparatus, means for feeding a film, means operable for starting and stopping said feeding means, a source of electric light for cooperation with the film as it is being fed, means operable for changing the current which passes through said light source, and control means interconnecting said stopping and starting means and said current changing means for reducing the current which passes through said light source when the feeding of the film is stopped.

59. In a film handling apparatus, means for feeding a film, means operable for stopping and starting said feeding means, a source of electric light for cooperation with the film as it is being fed, means operable for changing the current which passes through said light source, and means controlled by the film and interconnecting said starting and stopping means and said current changing means for reducing the current which passes through said light when said feeding means are stopped.

60. In a film handling apparatus, means for feeding a film, means operable for stopping and starting said feeding means, a source of electric light for cooperation with the film as it is being fed, means operable for varying the current consumption of said light source, and means controlled by changes in tension of the film and interconnecting said starting and stopping means and said current varying means for operating both of the same.

61. In a film handling apparatus, a gate, a film path defining member movable to position for cooperation with said gate, an electric light source for cooperation with the film, means operable for changing the current which passes through said light source, and control means interconnecting said path defining means and said current changing means for opening said gate and moving said path defining member to cooperative relation with said gate and operating said current changing means for reducing the amount of current which reaches said light source while said gate is open.

62. In a film handling apparatus, a gate including a fixed section and a movable section, a movable film path defining member, means operable for moving said movable gate section to open position and said path defining member to cooperative path defining relation with said gate, an electric light source for cooperation with the film, means for changing the amount of current which reaches said light source, and means controlled by the film interconnecting said moving means and said current changing means for operating said moving and said current changing means for reducing the amount of current which reaches said light source while said gate is open.

63. In a film handling apparatus, a gate, a film path defining member movable to position for cooperation with said gate, an electric light source, means operable for varying the current consumption of said light source, control means interconnecting said path defining means and said current varying means for opening said gate and moving said guiding member to cooperative relation with said gate and operating said current varying means, and means actuated by changes in the tension of the film for operating said control means.

64. In a film handling apparatus having means for feeding a film therethrough, means for rewinding a film, a source of electric light for cooperation with the film as it is being fed, means for changing the current which passes through said light source, and control means interconnecting said rewinding means and said current changing means for reducing the amount of current passing through said light source while film is being rewound.

65. In a film handling apparatus having means for feeding a film therethrough, means for rewinding the film, a source of electric light for cooperation with the film as it is being fed, means for changing the current which passes through said light source, and means controlled by the film and interconnecting said rewinding means and said current changing means for reducing the amount of current passing through said light source while the film is being rewound, 66. In a film handling apparatus having means for feeding a film therethrough, means for rewinding the film, a source of electric light for cooperation with the film as it is being fed, means for changing the current which passes through said light source, and means controlled by changes in the tension of the film and interconnecting said rewinding means and said current changing means for reducing the amount of current passing through said light source while the film is being rewound.

67. In a film handling apparatus having means for feeding a film therethrough, a source of electric light, means for varying the current consumption of said light source, a shutter for cooperation with the film and said light source, means for predeterminedly stopping said shutter, and control means interconnecting said shutter stopping means and said current varying means for assuring a current consumption by said light source while the said shutter is stopped different from the current consumption by said light source while said shutter is operatively moving.

68. In a film handling apparatus having means for feeding a film therethrough, a source of electric light, means for varying the current consumption of said light source, a shutter for cooperating with the film and said light source, means for predeterminedly stopping said shutter, and means controlled by the film and interconnecting said shutter stopping means and said current varying means for assuring a current consumption by said light source while said shutter is stopped different from the current consumption by said light source while said shutter is operatively moving.

69. In a film handling apparatus having means for feeding a film therethrough, a source of electric light, means for varying the current consumption of said light source, a shutter for cooperating with the film and said light source, means for predeterminedly stopping said shutter for showing still pictures by said light source, and means controlled by changes in the tension of the film and interconnecting said shutter stopping means and said current varying means for assuring a current consumption by said light while said shutter is stopped different from the current consumption by said light source while the shutter is being operatively moved.

70. In a motion picture apparatus, means for moving a film in a projecting direction, means for moving the film in a rewinding direction, projecting means cooperating with the film between said moving means, a prime mover for said moving means, operable means to connect separately the prime mover and each of said moving means, and control means actuated by film tension for operating said connecting means.

71. In a film handling apparatus, a continuously operable film supporting member, an intermittently operable toothed feeding member for feeding the film in relation to said supporting member, means for protecting the film from the teeth of said feeding member a movable compensating member and so disposed that upon movement thereof in one direction said movable compensating member engages the film and increases the stretch of the film between said supporting member and said feeding member whereby compensation may be secured for the difference in the character of movement of said continuous member and said intermittent member, means for moving said compensating member in said direction, means for rendering said protective means operative upon the film, and a connection between said movable compensating member and said operating means for actuating said operating means upon the movement of said movable compensating member in the opposite direction under the influence of the film upon the decreasing of the said stretch of the film between said supporting member and said feeding member.

72. In a film handling apparatus, a continuously operable film supporting member, an openable gate, said gate including a fixed section and a section movable relatively thereto, an intermittently operable feeding member for feeding the film in relation to said supporting member and through said gate between the sections thereof, means for moving said movable gate section in relation to said fixed gate section, a movable member engageable with the film between said supporting member and said feeding member and so disposed that upon movement in one direction it engages the film and increases the stretch of the film between said supporting member and said feeding member whereby compensation may be secured for the difference in the character of movement of said continuous member and said intermittent member, means for moving said member in said direction, and a connection between said gate-moving means and said movable member for actuating said gate-moving means upon the movement of said movable member in the opposite direction under the influence of the film upon the decreasing of the said stretch of the film between said supporting member and said feeding member.

WARREN DUNHAM FOSTER.
EARLE L. PARMELEE.